(12) United States Patent
Yoshida et al.

(10) Patent No.: US 11,484,113 B2
(45) Date of Patent: Nov. 1, 2022

(54) ELECTRIC TOOTHBRUSH, SYSTEM, BRUSHING SITE DETECTION METHOD, AND COMPUTER-READABLE RECORDING MEDIUM

(71) Applicant: OMRON HEALTHCARE Co., Ltd., Muko (JP)

(72) Inventors: Hideaki Yoshida, Kyoto (JP); Motofumi Nakanishi, Kyoto (JP); Tatsuya Kobayashi, Kyoto (JP); Takahide Tanaka, Kyoto (JP)

(73) Assignee: OMRON HEALTHCARE Co., Ltd., Muko (JP)

( * ) Notice: Subject to any disclaimer, the term of this patent is extended or adjusted under 35 U.S.C. 154(b) by 592 days.

(21) Appl. No.: 16/693,571

(22) Filed: Nov. 25, 2019

(65) Prior Publication Data

US 2020/0093253 A1 Mar. 26, 2020

Related U.S. Application Data

(63) Continuation of application No. PCT/JP2018/021986, filed on Jun. 8, 2018.

(30) Foreign Application Priority Data

Jul. 11, 2017 (JP) .............................. JP2017-135687

(51) Int. Cl.
*A46B 15/00* (2006.01)
*A46B 13/02* (2006.01)
(Continued)

(52) U.S. Cl.
CPC ........ *A46B 15/0002* (2013.01); *A46B 13/023* (2013.01); *A61C 17/221* (2013.01);
(Continued)

(58) Field of Classification Search
CPC ............ A46B 15/0038; A46B 15/0002; A46B 15/0044; A46B 15/0046; A46B 15/004; A46B 15/0006; A46B 15/0008
See application file for complete search history.

(56) References Cited

U.S. PATENT DOCUMENTS

| | | |
|---|---|---|
| 2013/0074616 A1 | 3/2013 | Puurunen et al. |
| 2015/0044629 A1 | 2/2015 | Wang et al. |

FOREIGN PATENT DOCUMENTS

| | | |
|---|---|---|
| CN | 102036581 A | 4/2011 |
| CN | 105029891 A | 11/2015 |

(Continued)

OTHER PUBLICATIONS

English-language translation of International Preliminary Report on Patentability dated Jan. 16, 2020, in corresponding International Application No. PCT/JP2018/021986; 6 pages.

(Continued)

*Primary Examiner* — Shay Karls
(74) *Attorney, Agent, or Firm* — Maier & Maier, PLLC

(57) ABSTRACT

An electric toothbrush includes a gyro sensor inside a main body. The gyro sensor detects an angular velocity of the main body and the main body includes a head portion, a neck portion, and a grip portion in a longitudinal axis direction. An angle formed by a longitudinal axis of the main body in a state that brush bristles of the head portion contact with a brushing site in a dentition with respect to the longitudinal axis of the main body in a state that the brush bristles of the head portion contact with a reference position in the dentition is obtained, based on an output from the gyro sensor. A corresponding point corresponding to the brushing site on an approximate curve that curves corresponding to the dentition (Continued)

is obtained based on the angle, and coordinates of the corresponding point are used as a translational position of the brushing site.

13 Claims, 24 Drawing Sheets

(51) Int. Cl.
- *A61C 17/22* (2006.01)
- *A61C 17/34* (2006.01)
- *G01C 19/00* (2013.01)
- *G01C 1/00* (2006.01)

(52) U.S. Cl.
CPC ........ *A61C 17/224* (2013.01); *A61C 17/3481* (2013.01); *G01C 1/00* (2013.01); *G01C 19/005* (2022.01); *A46B 2200/1066* (2013.01)

(56) References Cited

FOREIGN PATENT DOCUMENTS

| CN | 105466422 A | 4/2016 |
| JP | 2009-240759 A | 10/2009 |
| JP | 2016-532492 A | 10/2016 |
| JP | 2017-60662 A | 3/2017 |

OTHER PUBLICATIONS

Chinese Office Action dated Dec. 15, 2020, in connection with corresponding CN Application No. 201880030390.3 (13 pp., including machine-generated English translation).

Translation of International Search Report dated Jul. 24, 2018 and Written Opinion in corresponding International Application No. PCT/JP2018/021986; 9 pg.

Tsutomu Saka, "The studies on the factor analysis of the morphologic variation of the palatal vault—In relation to the maxillo-facial-cranial pattern—" Japanese Journal of Oral and Maxillofacial Surgery, vol. 34, No. 3, p. 451-469, Mar. 1988, 19 pgs.

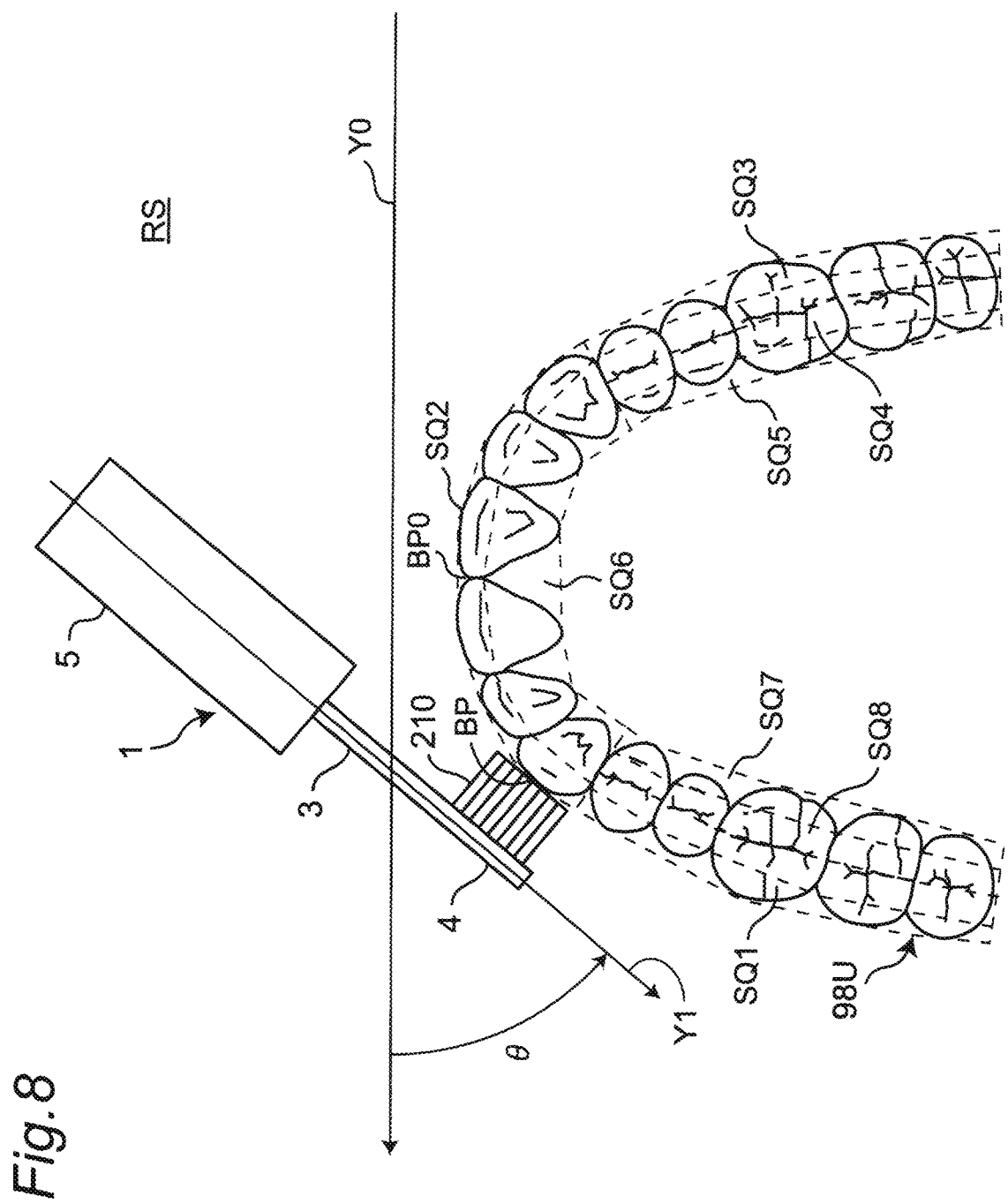

MANDIBULAR DENTITION FRONT TOOTH

MANDIBULAR DENTITION FRONT TOOTH

ELECTRIC TOOTHBRUSH, SYSTEM, BRUSHING SITE DETECTION METHOD, AND COMPUTER-READABLE RECORDING MEDIUM

CROSS-REFERENCE TO RELATED APPLICATION

This is a continuation application of International Application No. PCT/JP2018/021986, with an International filing date of Jun. 8, 2018, which claims priority of Japanese Patent Application No. 2017-135687 filed on Jul. 11, 2017, the entire content of which is hereby incorporated by reference.

FIELD

The present invention relates to an electric toothbrush, a system, and a brushing site detection method that are capable of detecting a brushing site in a dentition.

The present invention also relates to a computer-readable recording medium that non-transitorily stores a program for causing a computer to execute such a brushing site detection method.

BACKGROUND

Conventionally, for example, an electric toothbrush disclosed in Patent Literature 1 (JP 2009-240759 A) includes an acceleration sensor in a toothbrush main body, and a brushing site in a dentition during brushing tooth (which represents a translational position in a plane defined by the dentition in this document) is obtained by calculating movement amounts in an x-axis direction, a y-axis direction, and a z-axis direction by performing second-order integration on respective dynamic acceleration components in the x-axis direction, y-axis direction, and z-axis direction obtained from the output of the acceleration sensor.

Further, this document discloses that, based on a gravitational acceleration component obtained from an output of the acceleration sensor, a direction around a longitudinal axis (y-axis) of the toothbrush (referred to as a "brush angle" in this document) is obtained. Alternatively, it is also disclosed that a toothbrush main body is further provided with a gyro sensor (gyroscope) and an output of the gyro sensor is cumulatively added (integrated) to obtain a brush angle. Based on the brush angle obtained in this manner, it can be recognized which one of a front surface, a rear surface, and an occlusal surface of the tooth is being brushed.

SUMMARY

However, in the electric toothbrush of Patent Literature 1, a vibration component from a drive motor that vibrates the brush (brush bristles) is included as noise in the output of the acceleration sensor. Further, since the dynamic acceleration component obtained from the output of the acceleration sensor is second-order integrated in order to obtain the translational position of the brushing site, it is greatly affected by noise in the calculation process. For this reason, there is a problem that the accuracy of the obtained translational position of the brushing site is not good enough.

Therefore, an object of the present invention is to provide an electric toothbrush, a system, and a brushing site detection method capable of accurately obtaining a translational position of the brushing site in a dentition.

Moreover, an object of the present invention is to provide a computer-readable recording medium that non-transitorily stores a program for causing a computer to execute such a brushing site detection method.

To solve the above problem, an electric toothbrush according to the present disclosure comprises:

a main body including, along its longitudinal axis direction, a head portion having a brush side on which brush bristles are planted, a grip portion to be held by a human hand, and a neck portion configured to connect the head portion and the grip portion;

a gyro sensor mounted inside the main body and configured to detect an angular velocity of the main body;

a brushing site detection unit configured to obtain a translational position of a brushing site in a dentition based on an output from the gyro sensor; and a receiving unit that is capable of receiving a setting parameter from outside of the main body, wherein the brushing site detection unit sets an approximate curve that curves corresponding to the dentition as a curve line equivalent to a part of an ellipse expressed by a function $y=b[\{1-(x/a)^2\}^{1/2}-1]$ using positive coefficients a and b or as a parabola expressed by a function $4py=x^2$ using a negative coefficient p, in a data space where an xy rectangular coordinate system is defined, sets the coefficients a and b or the coefficient p variably according to the setting parameter received via the receiving unit, obtains, based on the output from the gyro sensor, an angle formed by a longitudinal axis of the main body in a state that the brush bristles of the head portion contact with the brushing site in the dentition with respect to the longitudinal axis of the main body in a state that the brush bristles of the head portion contact with a reference position in the dentition, and obtains, based on the angle, a corresponding point corresponding to the brushing site on the approximate curve to use coordinates of the corresponding point as the translational position of the brushing site.

In the present description, the "brushing site" refers to a site that is brushed with the above-described brush bristles (where the brush bristles contact with) in a plurality of sites defined by dividing surfaces of the dentition in the oral cavity. The brushing site in the dentition is specified by a combination of a translational position in the real space where the dentition exists and which one of the front, rear, and occlusal surfaces of the dentition is being brushed.

The "reference position" of the dentition refers to a certain position as a reference for measuring the angle in the dentition.

In another aspect, an electric toothbrush of the present disclosure comprises:

a main body including, along its longitudinal axis direction, a head portion having a brush side on which brush bristles are planted, a grip portion to be held by a human hand, and a neck portion configured to connect the head portion and the grip portion;

a gyro sensor configured to detect an angular velocity of the main body, and an acceleration sensor, which are mounted inside the main body; and a brushing site detection unit that specifies the brushing site in the dentition based on the output of the gyro sensor and the output of the acceleration sensor, wherein the brushing site detection unit obtains an angle formed by the longitudinal axis of the main body in a state that the brush bristles of the head portion contact with the brushing site in the dentition with respect to the longitudinal axis of the main body in a state that the brush bristles of the head portion contact with a reference position in the dentition, obtains, based on the angle, a corresponding point corresponding to the brushing site on an approximate curve that curves corresponding to the dentition to use coordinates of the corresponding point as a translational position of the brushing site, obtains a direction that the brush bristles of the head portion are facing around the longitudinal axis of the main body based on a direction of a gravitational acceleration output from the acceleration sensor and determines which one of a front surface, a rear surface, and an occlusal surface of the dentition is being brushed based on the direction that the brush bristles of the head portion are facing, and specifies the brushing site in the dentition according to a combination of the translational position of the brushing site obtained based on the output from the gyro sensor and a determination result which one of the front, rear, and occlusal surfaces of the dentition is being brushed.

In another aspect, a system according to the present disclosure comprises:

the above-described electric toothbrush; and a computer device provided outside the main body of the electric toothbrush, the electric toothbrush and the computer device being capable of communicating with each other.

The "computer device" may be any device as long as the devices substantially operate as a computer. For example, a smartphone, a tablet terminal, and the like may be used.

In another aspect, a brushing site detection method of the present disclosure is a brushing site detection method for detecting a brushing site brushed by an electric toothbrush in a dentition, in which the electric toothbrush includes a main body including, along its longitudinal axis direction, a head portion having a brush side on which brush bristles are planted, a grip portion to be held by a human hand, and a neck portion configured to connect the head portion and the grip portion, a gyro sensor mounted inside the main body and configured to detect an angular velocity of the main body, and a receiving unit that is capable of receiving a setting parameter from outside of the main body, and the brushing site detection method comprises:

setting an approximate curve that curves corresponding to the dentition as a curve line equivalent to a part of an ellipse expressed by a function $y=b[\{1-(x/a)^2\}^{1/2}-1]$ using positive coefficients a and b or as a parabola expressed by a function $4py=x^2$ using a negative coefficient p, in a data space where an xy rectangular coordinate system is defined;

setting the coefficients a and b or the coefficient p variably according to the setting parameter received via the receiving unit;

obtaining a difference angle formed by a longitudinal axis of the main body in a state that the brush bristles of the head portion contact with the brushing site in the dentition with respect to the longitudinal axis of the main body in a state that the brush bristles of the head portion contact with a reference position in the dentition based on an output from the gyro sensor in a real space where the dentition exists; and obtaining, based on the difference angle in the real space, a corresponding point corresponding to the brushing site on the approximate curve set in the data space to use coordinates of the corresponding point as data that represents a translational position of the brushing site.

In another aspect, a computer-readable recording medium of the present disclosure is a recording medium that non-transitorily stores a program for causing a computer to execute the above-described brushing site detection method.

In still another aspect, a brushing site detection method of the present disclosure is a brushing site detection method for detecting a brushing site brushed by an electric toothbrush in a dentition, in which the electric tooth brush includes a main body including, along its longitudinal axis direction, a head portion having a brush side on which brush bristles are planted, a grip portion to be held by a human hand, and a neck portion configured to connect the head portion and the grip portion, a gyro sensor configured to detect an angular velocity of the main body, and an acceleration sensor, which are mounted inside the main body, and the brushing site detection method comprises:

obtaining an angle formed by the longitudinal axis of the main body in a state that the brush bristles of the head portion contact with the brushing site in the dentition with respect to the longitudinal axis of the main body in a state that the brush bristles of the head portion contact with a reference position in the dentition based on an output from the gyro sensor;

obtaining, based on the angle, a corresponding point corresponding to the brushing site on an approximate curve that curves corresponding to the dentition to use coordinates of the corresponding point as a translational position of the brushing site;

obtaining a direction that the brush bristles of the head portion are facing around the longitudinal axis of the main body based on a gravitational acceleration output from the acceleration sensor to determine which one of a front surface, a rear surface, and an occlusal surface of the dentition is being brushed according to the direction that the brush bristles of the head portion are facing; and specifying the brushing site in the dentition based on a combination of the translational position of the brushing site obtained based on the output from the gyro sensor and the determination result which one of the front, rear and occlusal surfaces of the dentition is being brushed.

In still another aspect, a computer-readable recording medium of the present disclosure is a recording medium that non-transitorily stores a program for causing a computer to execute the above-described brushing site detection method.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 8 is a diagram for explaining a difference angle θ formed by a longitudinal axis (Y-axis) of a main body in a state that the brush bristles of the head portion contact with the brushing site in a dentition with respect to the longitudinal axis (Y axis) of the main body in a state that the brush bristles of the head portion contact with a reference position of the dentition in a real space.

DETAILED DESCRIPTION

Hereinafter, embodiments of the present invention will be described in detail with reference to the drawings.
(Configuration of Electric Toothbrush)

Figure 1A:
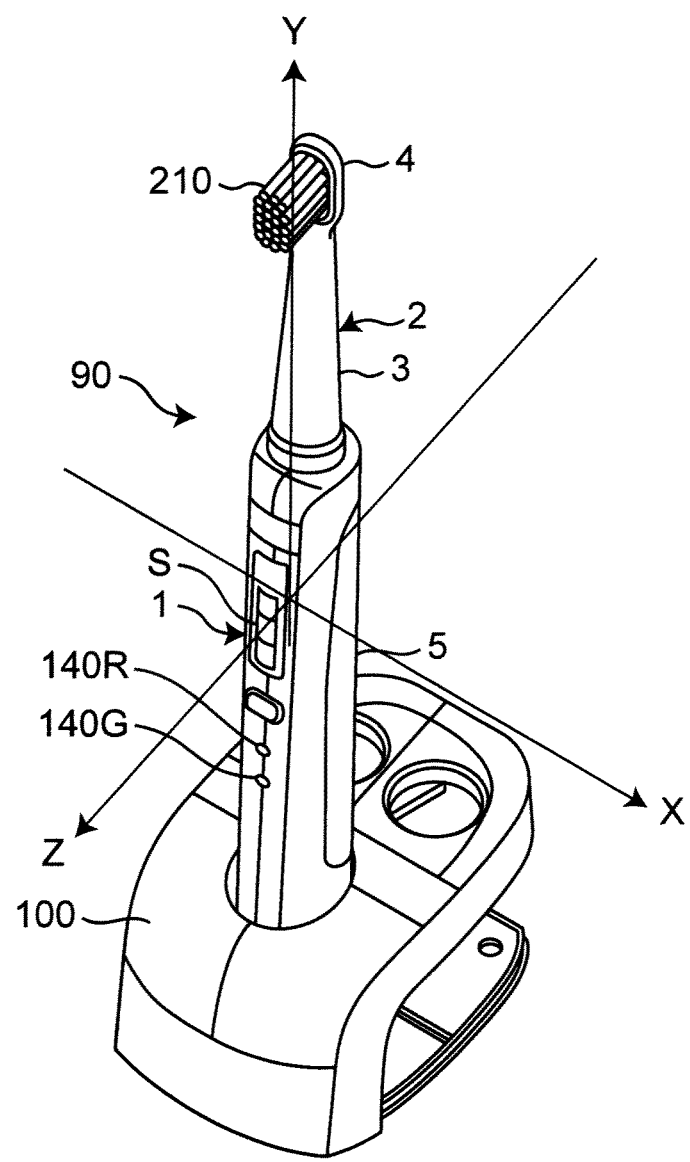
FIGS. 1A and 1B are diagrams illustrating an appearance of an electric toothbrush according to an embodiment of the present invention, which are obliquely viewed from opposite sides.
Figure 1B:
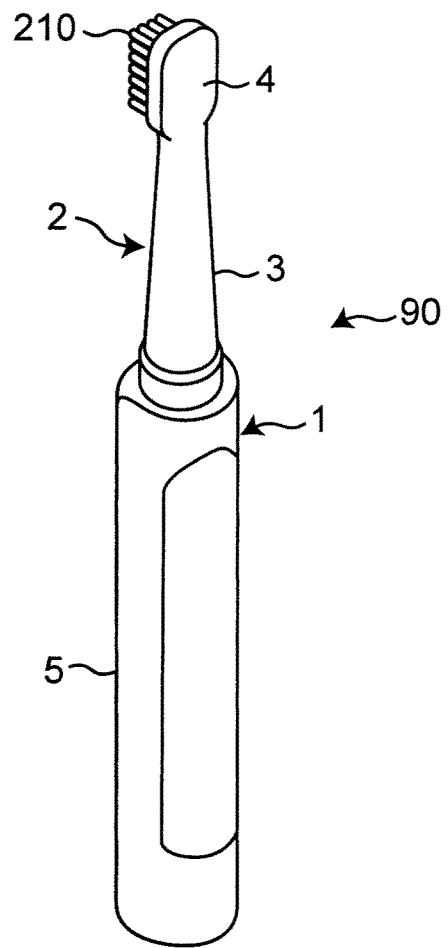

FIGS. 1A and 1B illustrate, obliquely viewed from opposite sides, an external appearance of an electric toothbrush (entirely indicated by reference numeral 90) of an embodiment according to the present invention. This electric toothbrush 90 includes a head portion 4 with planted brush bristles 210, a grip portion 5 to be held by a human hand, and a neck portion 3 that connects the head portion 4 and the grip portion 5 in the longitudinal axis direction (Y-axis direction). The head portion 4 and the neck portion 3 are integrally configured as a brush member 2 that can be attached to and detached from the grip portion 5. The head portion 4, the neck portion 3, and the grip portion 5 are collectively referred to as a main body 1. The main body 1 has an elongated shape in the Y-axis direction for the convenience of brushing teeth. Note that a charger 100 is illustrated in FIG. 1A.

Figure 2:
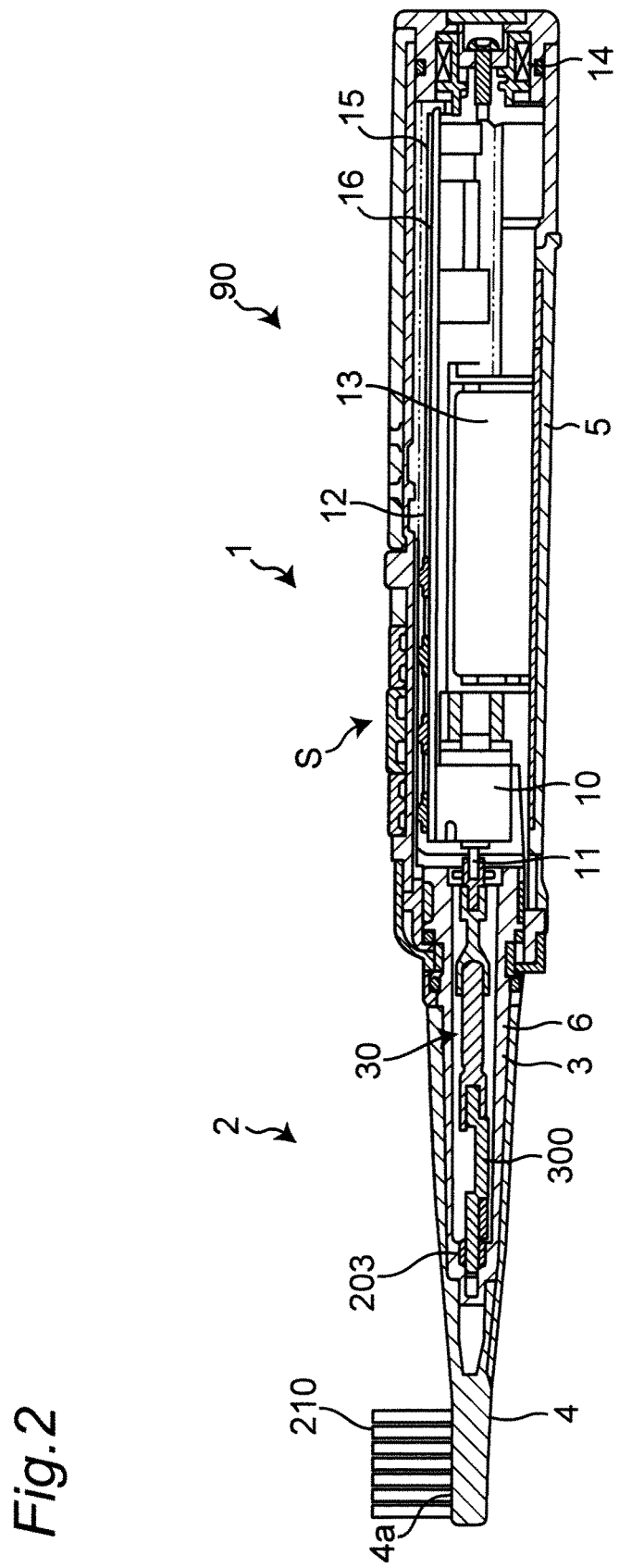
FIG. 2 is a diagram illustrating a longitudinal section when the electric toothbrush is cut along the longitudinal axis direction.

FIG. 2 illustrates a longitudinal section of the electric toothbrush 90 cut along the longitudinal axis (Y-axis). The grip portion 5 has a stem 6 provided so as to protrude from the outer casing of the grip portion 5 toward the neck portion 3 side. The stem 6 has a cylindrical shape with a closed tip. In this example, the neck portion 3 of the brush member 2 is engaged and attached so as to cover the stem 6. Since the brush member 2 is a consumable part, it is configured to be detachable from the grip portion 5 so that it can be replaced with a new one. On one surface (brush side) 4a of the head portion 4 of the brush member 2, brush bristles (brushes) 210 are planted so as to protrude about 10 mm to 12 mm from the brush side 4a by flocking in this example. The brush bristles 210 may be welded or bonded instead of flocking.

A power switch S for turning on and off the power is provided on an outer surface of the grip portion 5 of the main body 1. Inside the grip portion 5, there are mounted a motor 10 as a drive source, a drive circuit 12, a rechargeable battery 13 as a power supply unit, a charging coil 14, an acceleration sensor 15, a gyro sensor 16, and the like. When charging the rechargeable battery 13, the rechargeable battery 13 can be charged in a non-contact manner by electromagnetic induction only by simply placing the main body 1 on the charger 100 illustrated in FIG. 1A.

As illustrated in FIG. 2, a bearing 203 is provided inside the stem 6. A tip of an eccentric shaft 30 connected to a rotary shaft 11 of the motor 10 is inserted into the bearing 203. The eccentric shaft 30 has a weight 300 in the vicinity of the bearing 203, and the center of gravity of the eccentric shaft 30 is deviated from the center of the rotation. When the drive circuit 12 supplies a drive signal (for example, a pulse width modulation signal) according to an operation mode to the motor 10 and rotates the rotary shaft 11 of the motor 10, the eccentric shaft 30 also rotates with the rotation of the rotary shaft 11. The eccentric shaft 30 moves around the center of rotation because the center of gravity is shifted from the center of rotation. Therefore, the tip of the eccentric shaft 30 repeatedly collides with an inner wall of the bearing 203, and this vibrates (moves) the brush bristles 210 at high speed.

In this example, the acceleration sensor 15 is a commercially available product of Micro Electro Mechanical Systems (MEMS) type, and outputs a signal representing accelerations of three axes, the X, Y, and Z axes. X, Y, and Z indicate orthogonal coordinate systems fixed to the main body 1. In this example, as illustrated in FIG. 1A, the X axis is parallel to the brush side 4a, and the Y axis is aligned in the direction from the grip portion 5 to the head portion 4 in the longitudinal axis direction of the main body 1. In addition, the Z axis is set to coincide with the direction from the brush side 4a toward the tips of the brush bristles 210. For example, when the main body 1 is placed on the charger 100, the gravitational acceleration vector is in the −Y direction and, when the tips of the brush bristles 210 are directed downward, the gravitational acceleration vector is in the +Z direction. The output of the acceleration sensor 15 related to each axis is input to a later described control unit 110, and is used to specify the brushing site (the details will be described later).

In this example, the gyro sensor 16 is made of a commercially available product of MEMS type, and outputs a signal indicating the angular velocity of the X, Y, and Z axes, which are the angular velocity around the Z axis, the angular velocity around the X axis, and the angular velocity around the Y axis. The output of each axis of the gyro sensor 16 is input to the control unit 110, which will be described later, and is used together with the output of the acceleration sensor 15 to specify the brushing site (the details will be described later).

Whether or not the brush bristles 210 actually contact with the brushing site is detected by an unillustrated load sensor (which detects a load acting on the brush bristles 210) provided in the main body 1.

Figure 3:
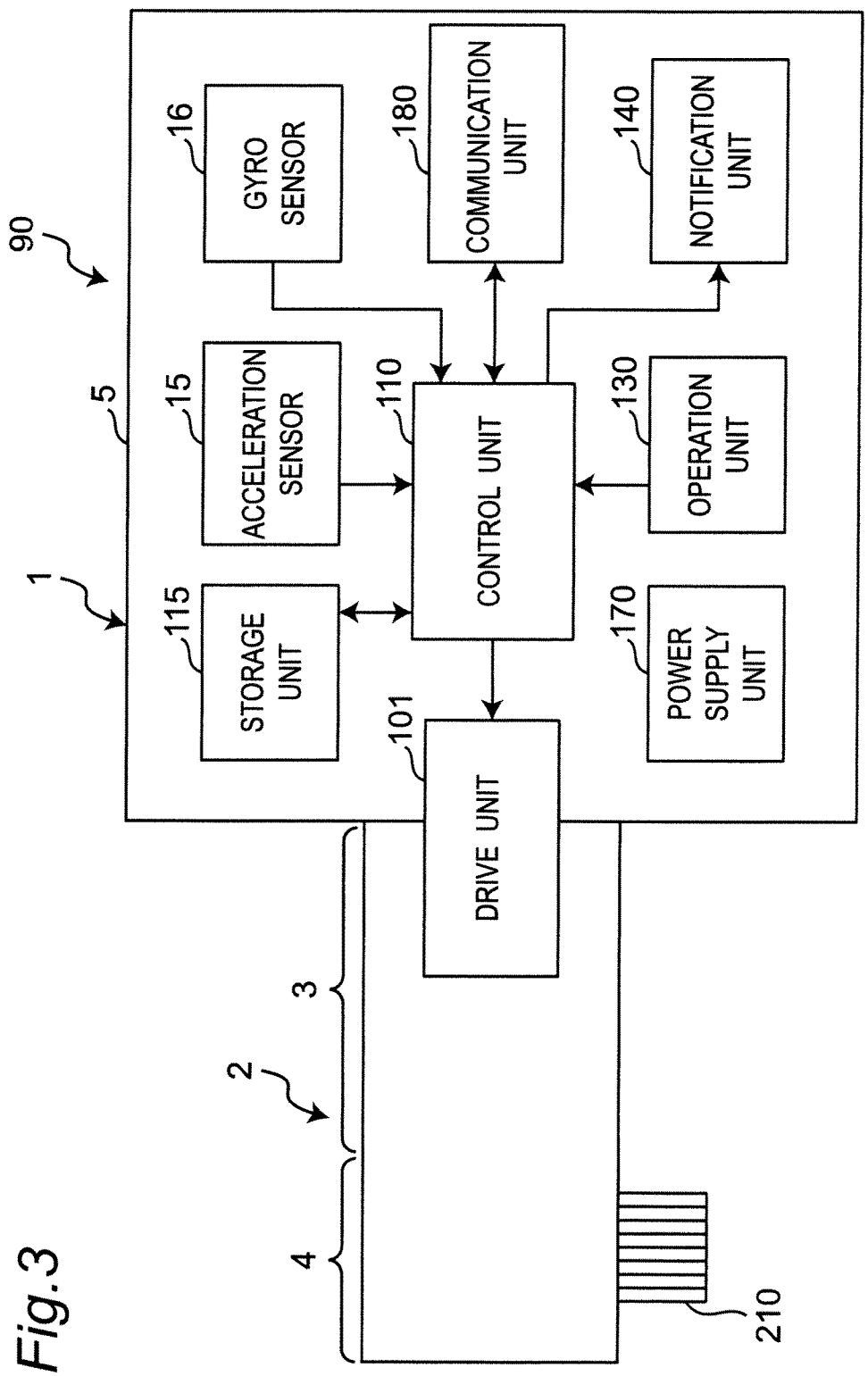
FIG. 3 is a diagram illustrating a block configuration of a control system of the electric toothbrush.

FIG. 3 illustrates a block configuration of a control system of the electric toothbrush 90. Inside the grip portion 5 of the electric toothbrush 90, in addition to the above described acceleration sensor 15 and the gyro sensor 16, the control unit 110, a storage unit 115, an operation unit 130, and a notification unit 140, a communication unit 180, and a power supply unit 170, which form the above drive circuit 12, are provided. Note that a drive unit 101 represents the above described motor 10, rotary shaft 11, eccentric shaft 30, bearing 203, and weight 300.

In this example, the control unit 110 includes a central processing unit (CPU) that is operated by software and performs a process for specifying a brushing site in the dentition and various other processes, in addition to driving the motor 10. Further, the control unit 110 has a built-in timer for measuring time.

The operation unit 130 includes the above described power switch S, and operates so that a user can turn on or off the power of the electric toothbrush 90.

In this example, the storage unit 115 includes an electrically rewritable nonvolatile memory (EEPROM) that can store data in a non-transitory manner. The storage unit 115 stores a control program for controlling the control unit 110. Further, in this example, the storage unit 115 stores data related to brushing such as data indicating actual brushing time for each site in the dentition (referred to as "actual brushing time data") during brushing the teeth, as a table (which is described later).

In this example, the notification unit 140 includes a red Light Emitting Diode (LED) lamp 140R and a green LED lamp 140G (see FIG. 1A), and informs progress of brushing compared to a predetermined brushing procedure by turning on and off the LED lamps 140R and 140G. Further, the notification unit 140 may include a buzzer (not shown), and may notify the progress of brushing compared to the brushing procedure by ringing the buzzer.

The communication unit 180 is controlled by the control unit 110 to transmit, as a transmission unit, various types of information (actual brushing time data and the like) to an external device via a network, or receives, as a receiving unit, various types of information (a later described setting parameter or the like) from an external device via the network to transfer the information to the control unit 110. In this example, the communication via this network is wireless communication (for example, Bluetooth (BT (registered trademark)) communication, BLE (Bluetooth (registered trademark) low energy) communication, or the like). The network is typically a home local area network (LAN) or a hospital LAN, but is not limited thereto, and the Internet or the like may be used.

The power supply unit 170 includes the above described rechargeable battery 13, and supplies power (in this example, a DC voltage) to each unit in the electric toothbrush 90.

(Sites in Dentition)

Figure 6:
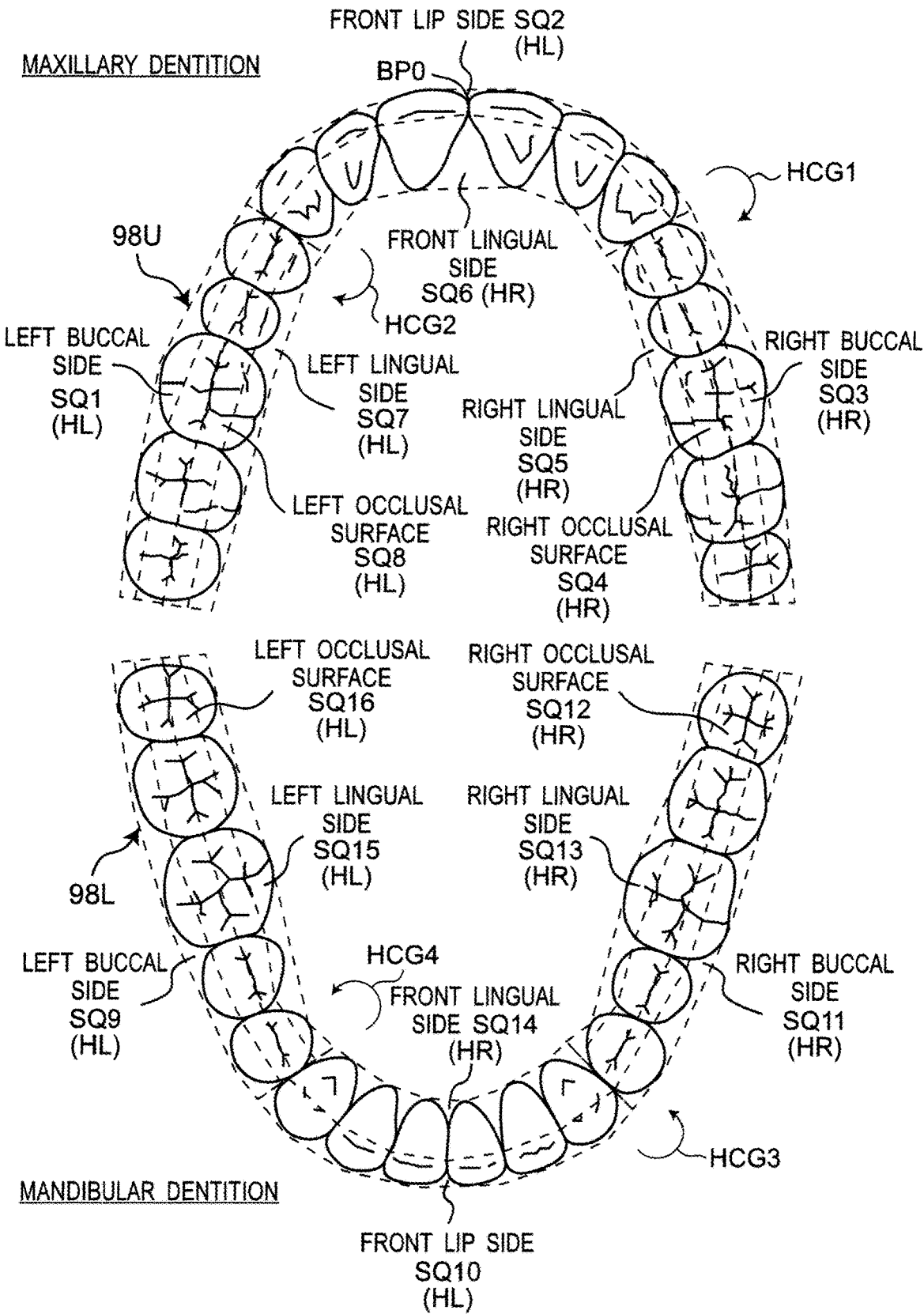
FIG. 6 is a diagram illustrating 16 sites in the dentition in the oral cavity.

In this example, as illustrated in FIG. 6, the upper and lower dentitions 98U and 98L are divided into 16 sites SQ1, SQ2, . . . , and SQ16 (the boundaries between the adjacent sites are indicated with broken lines). The maxillary dentition 98U includes a left buccal site SQ1, a left occlusal surface site SQ8, and a left SQ7 in the left back tooth area, a front lip site SQ2 and a front lingual site SQ6 in the front tooth area, and a right buccal site SQ3, a right occlusal surface site SQ4, and a right lingual site SQ5 in the right back tooth area. The mandibular dentition 98L includes a left buccal site SQ9, a left occlusal surface site SQ16, and a left lingual site SQ15 in the left back tooth area, a front lip site SQ10 and a front lingual site SQ14 in the front tooth area, and a right buccal site SQ11, a right occlusal surface site SQ12, and a right lingual site SQ13 in the right back tooth area.

The maxillary dentition 98U includes six "front teeth" in total, comprising three teeth for each of left and right. Five are included as "left back teeth" and "right back teeth" respectively. These "left back teeth," "front teeth," and "right back teeth" divide a range of translational positions along the dental arch. In the maxillary dentition 98U, the range of the "front teeth" is divided into a range of 20 mm from the reference position BP0, which is the center of the front surface, to the right and left (that is, a range of 40 mm in the right and left width). The "left back tooth" is divided into a range exceeding 20 mm to the left from the center BP0 on the front surface. The "right back tooth" is divided into a range exceeding 20 mm to the right from the center BP0 on the front surface. These divisions are similar in the mandibular dentition 98L.

In summary, the maxillary dentition 98U and the mandibular dentition 98L are divided into the sites in combination of a range of translational positions along the dental arch and one of the front surface, the occlusal surface, and the rear surface, as indicated by the following Table 1. Here, the table body of Table 1 indicates the reference numerals SQ1 to SQ16 of each site determined by the combination of the translational position range ("left back tooth," "front tooth," or "right back tooth") listed on the top of the table and one of "front surface," "occlusal surface," and "rear surface" listed in the side of the table. Note that, for the "front teeth," a site (area) corresponding to the combination with "occlusal surface" is not set (which is indicated by "-").

TABLE 1

Sites in dentitions

| | | Range of translational positions | | |
|---|---|---|---|---|
| | | Left back tooth | Front tooth | Right back tooth |
| Maxillary dentition | Front surface | SQ1 | SQ2 | SQ3 |
| | Occlusal surface | SQ8 | — | SQ4 |
| | Rear surface | SQ7 | SQ6 | SQ5 |
| Mandibular dentition | Front surface | SQ9 | SQ10 | SQ11 |
| | Occlusal surface | SQ16 | — | SQ12 |
| | Rear surface | SQ15 | SQ14 | SQ13 |

Note that, the sites in the dentition is not limited to this example and smaller sites may be set. For example, the sites may be set by each tooth along the dental arch, or the sites may be set by right and left halves of each tooth.

(Brushing Site Detection Method)

Figure 4:
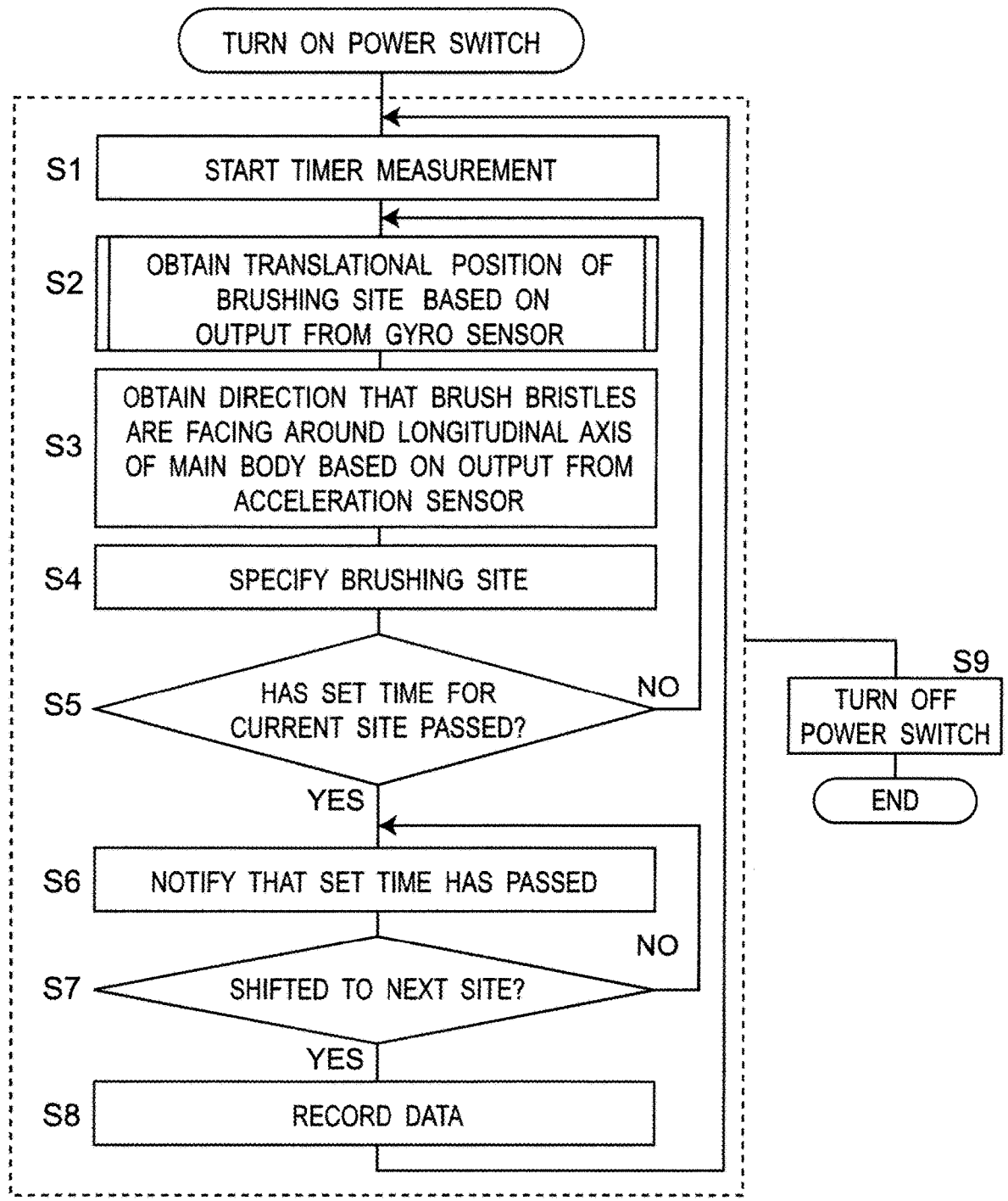
FIG. 4 is a diagram illustrating a schematic flow of a process for specifying a brushing site in a dentition, which is carried out by the electric toothbrush, as a brushing site detection method according to an embodiment of the present invention.

FIG. 4 illustrates a schematic flow of a process in which the control unit 110 of the electric toothbrush 90 specifies brushing sites in the dentitions 98U and 98L, as a brushing site detection method according to an embodiment. In this example, it is assumed that a brushing procedure is determined in advance so that brushing is performed in ascending order regarding the reference numerals, from the sites SQ1 to SQ8 in the maxillary dentition 98U and then from the sites SQ9 to SQ16 in the mandibular dentition 98L in FIG. 6.

In the flow of FIG. 4, when the user turns on the power switch S of the electric toothbrush 90, the control unit 110 rotates the motor 10 to vibrate the brush bristles 210. Here, according to the above brushing procedure, at the time (momentary) when the power switch S is turned on, the user applies the brush bristles 210 of the head portion 4 onto the reference position BP0 (see FIG. 8) that is the center of the front surface of the dentition 98U. The user can easily align the brush bristles 210 of the head portion 4 with this reference position BP0. As described in step 51 of FIG. 4, the control unit 110 starts measuring brushing time by a built-in timer.

Next, as described in step S2, the control unit 110 serves as a brushing site detection unit and obtains a translational position of the brushing site (represented by the symbol "BP") in the dentition 98U or 98L (initially limited to the maxillary dentition 98U) based on the output of the gyro sensor 16 (which will be described later in detail).

Next, as described in step S3, the control unit 110 serves as a brushing site detection unit, obtains direction (+Z direction) that the brush bristles 210 of the head portion 4 are facing around the longitudinal axis (Y axis) of the main body 1 based on the output of the acceleration sensor 15, and determines whether brushing is performed on the front surface, rear surface, or occlusal surface of the dentition 98U or 98L based on the direction (+Z direction) that the brush bristles 210 of the head portion 4 are facing (which will be described later in detail).

Next, as illustrated in step S4, the control unit 110 serves as a brushing site detection unit, and specifies the brushing site BP in the dentition 98U or 98L according to a combination of the translational position of the brushing site BP determined based on the output of the gyro sensor 16 and the determination result of whether one of the front, rear, or occlusal surfaces in the dentition 98U or 98L is being brushed.

Next, as described in step S5, the control unit 110 determines whether or not the brushing set time for the specified brushing site BP has passed based on the time measurement result by the built-in timer. When the brushing set time for the site BP has not yet passed (NO in step S5), the processes in steps S2 to S5 are repeated. In this example, the control unit 110 repeats the processing of steps S2 to S5 every 0.1 seconds as a processing unit time.

Next, when the brushing set time for the specified brushing site BP has passed (YES in step S5), the control unit 110 temporarily displays the green LED lamp 140G included in the notification unit 140 for about 0.2 seconds for example to inform the user that the brushing set time for the site BP has passed (step S6). For the site BP, when the user continues brushing even though the brushing set time has exceeded, for example, for 1 second or more (NO in step S7), a warning may be issued to the user by turning on the red LED lamp 140R temporarily for about 0.2 seconds for example in step S6 to prevent over-brushing, for example. Further, while the LED lamp 140G or 140R is temporary lit, the progress of brushing with respect to the brushing procedure may be notified by the sound of a buzzer included in the notification unit 140.

Next, when the user moves the head portion 4 to the "next site" of the specified brushing site BP in the dentition 98U or 98L (YES in step S7), the control unit 110 associates the specified brushing site BP and the actual brushing time for the site BP and records the associated data as actual brushing time data for each site in a table prepared in the storage unit 115 (step S8). Note that the storage unit 115 may also record other information related to brushing.

Thereafter, returning to step S1, the control unit 110 starts measuring the brushing time by the built-in timer for the "next site."

In this manner, the brushing site BP in the dentition 98U or 98L is sequentially specified, and the actual brushing time data for each site is sequentially recorded. Then, when the above brushing procedure is completed or the power switch S is turned off (step S9), the process ends.

(Process to Obtain Translational Position of Brushing Site)

Figure 5:
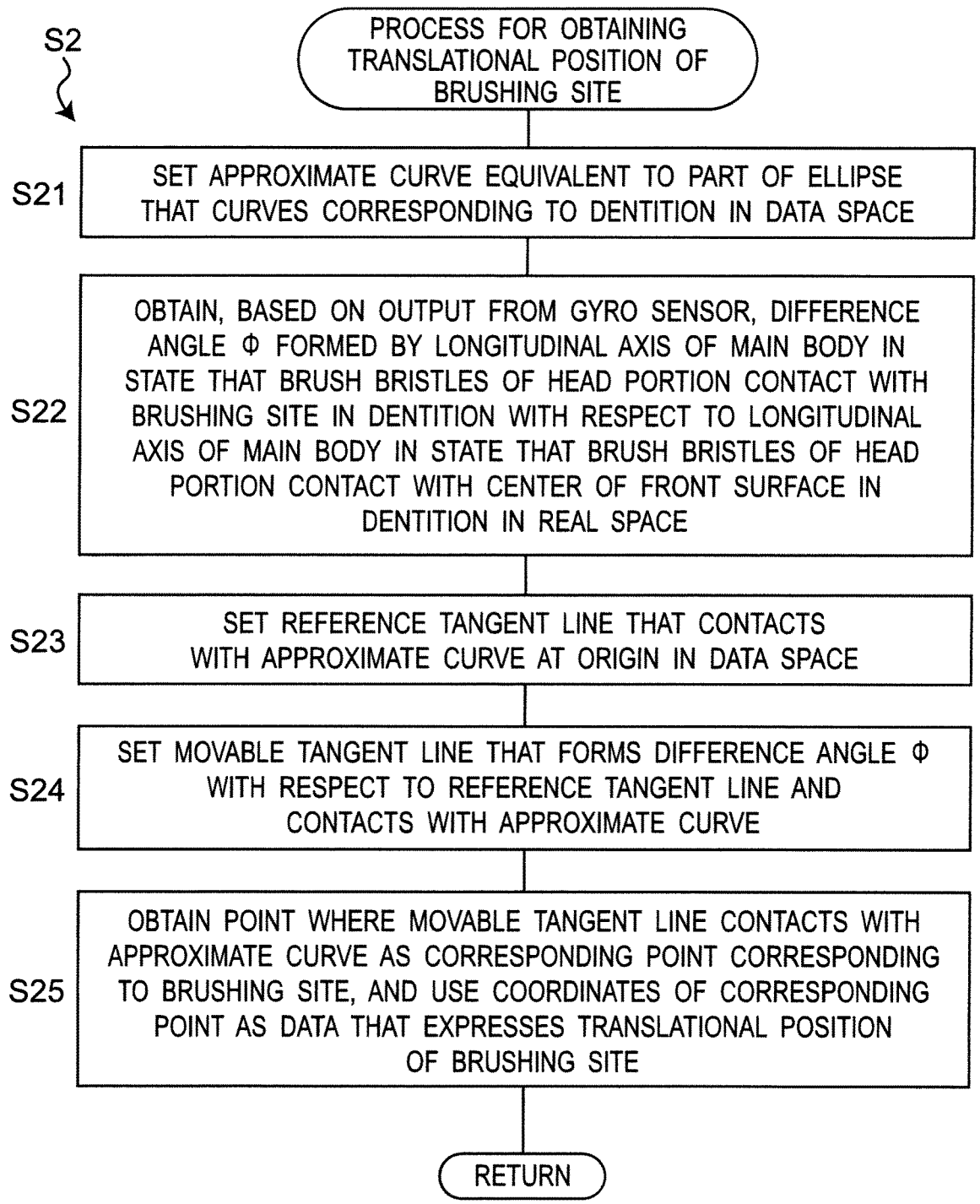
FIG. 5 is a diagram illustrating a detailed flow of a process (step S2) for obtaining a translational position of the brushing site described in FIG. 4.
Figure 9:
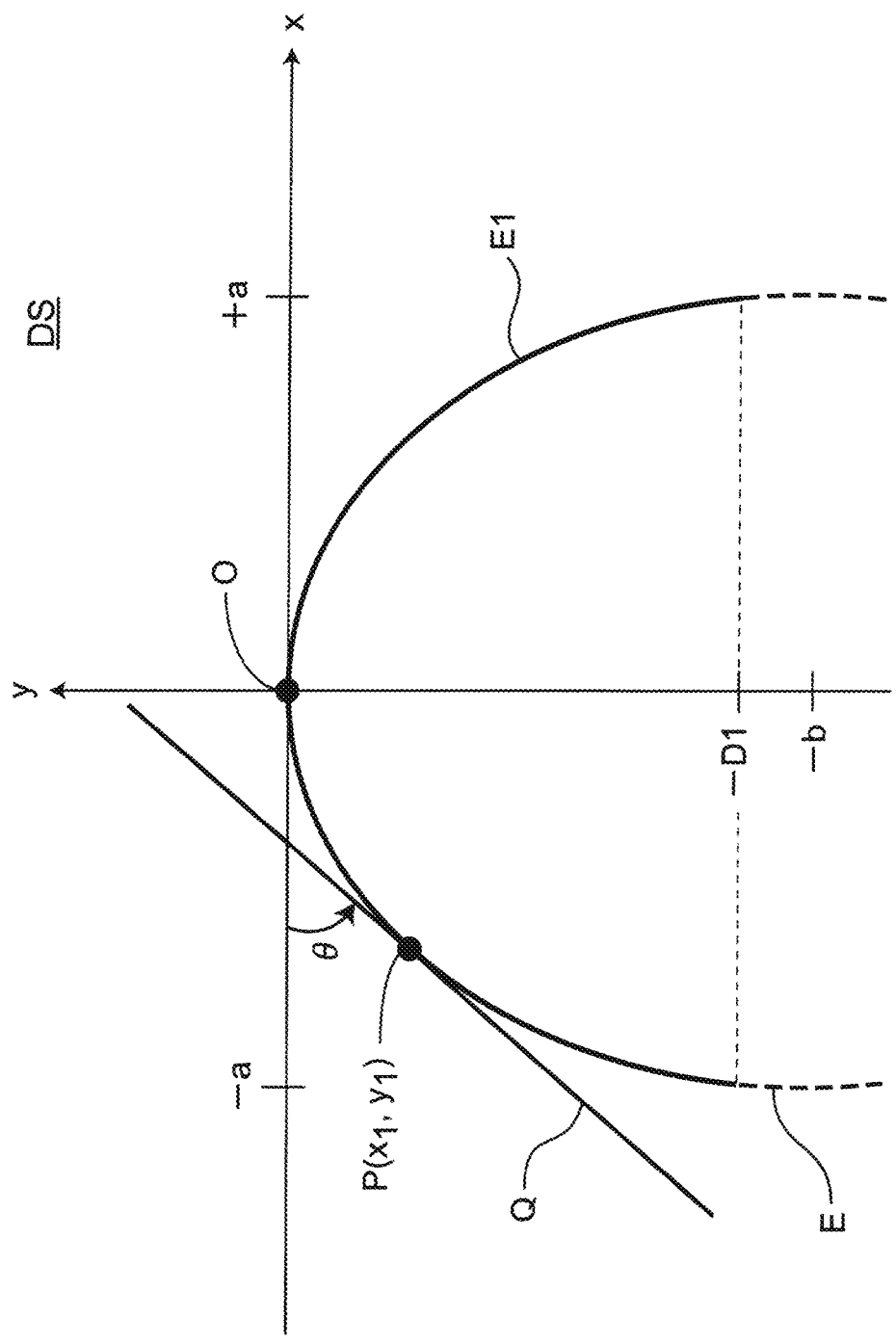
FIG. 9 is a diagram for explaining a process for obtaining a corresponding point corresponding to a brushing site on a "standard" approximate curve in a data space based on the difference angle θ.

The process in step S2 described in FIG. 4 (a process for obtaining a translational position of a brushing site based on an output of the gyro sensor 16) will be described with reference to the detailed flow in FIG. 5.

i) First, as illustrated in step S21 of FIG. 5, the control unit 110 serves as a brushing site detection unit, and sets an approximate curve E1, which is equivalent to a part of an ellipse E curved corresponding to the dentition 98U or 98L, as illustrated in FIG. 9, in the data space DS where the xy rectangular coordinate system is defined.

Figure 7A:
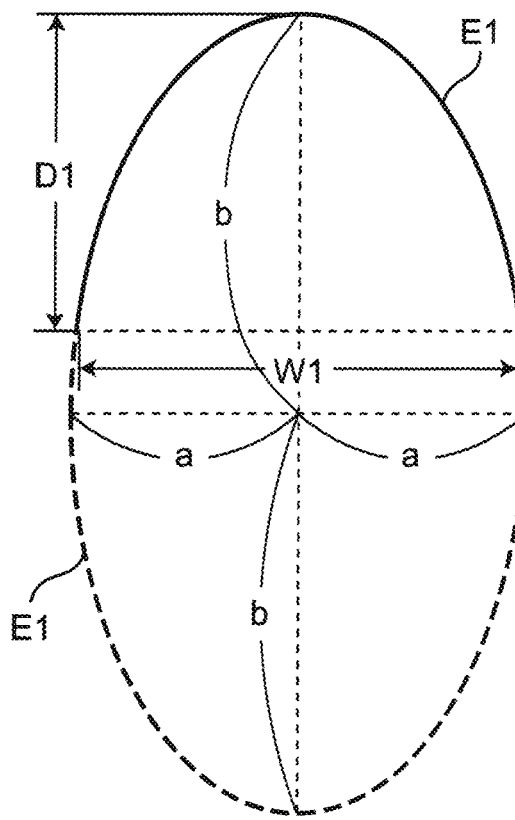
FIG. 7A is a diagram illustrating a "standard" approximate curve that is a part of an ellipse.

More specifically, as is known in the dental field, the dental arch can be approximated by a part of an ellipse (Non-Patent Literature 1: Tsutomu SAKA, "The studies on the factor analysis of the morphologic variation of the palatal vault -In relation to the maxillo-fadai-cranial pattern-," Journal of Japanese Society of Oral and Maxillofacial Surgeons, Vol. 34, No. 3, p451-469, March 1988). Therefore, in this example, as illustrated in FIG. 7A, a part with the depth D1≈50 mm and the width W1≈70 mm of the ellipse E having the minor axis 2a=71.76 mm and the major axis 2b=128.2 mm is used as the approximate curve E1 so as to correspond to a "standard" dentition.

In this example, as illustrated in FIG. 9, the approximate curve E1, being in a convex manner, is set so as to contact with the x axis at an origin O (0, 0) as a reference point. The ellipse E that contacts with the origin O (0, 0) in a convex manner with respect to the x axis can be expressed as $$(x/a)^2 + \{(y+b)/b\}^2 = 1 \qquad \text{(Eq. 1)}$$

where a and b are positive coefficients (i.e., a>0 and b>0). In particular, the approximate curve E1 equivalent to the upwardly convex part of the ellipse E is expressed by an explicit function as $$y = b[\{1^2 - (x/a)^2\}^{1/2} - 1] \qquad \text{(Eq. 1')}$$

In this case, the approximate curve E1 can be set to a manner approximating the actual dentition 98U or 98L by determining the coefficients a and b. Accordingly, the corresponding point P representing the translational position of the brushing site can be accurately obtained on the approximate curve E1.

Note that the process of step S21 may be executed only once after the power is turned on, instead of being performed each time the process of step S2 is performed. In addition, in this example, setting the approximate curve E1 in the data space DS represents to store the coordinates $(x_i, y_i)$ (i=0, 1, 2, ...) of the point sequence forming the approximate curve E1 in the storage unit 115. Further, the data of the approximate curve E1 may be stored in the storage unit 115 in advance.

ii) Next, as illustrated in step S22 of FIG. 5, the control unit 110 serves as a brushing site detection unit, and obtains a difference angle θ formed by the longitudinal axis (Y axis) Y1 of the main body 1 in a state that the brush bristles 210 of the head portion 4 contact with the brushing site BP of the dentition 98U or 98L (the dentition 98U is illustrated in the example of FIG. 8) with respect to the longitudinal axis (Y axis) Y0 of the main body 1 in a state that the brush bristles 210 of the head portion 4 contact with the reference position BP0 of the dentition 98U in a real space RS where the dentition 98U or 98L exists, as illustrated in FIG. 8, based on the output from the gyro sensor 16.

Specifically, in this example, as described above, when the power switch S is turned on (momentary), the user puts the brush bristles 210 of the head portion 4 onto the reference position BP0 that is the center of the front surface of the dentition 98U. Thereafter, the user continues to put the brush bristles 210 of the head portion 4 onto another sites (brushing sites) BP of the dentition 98U or 98L according to the brushing procedure. With this procedure, an angle (difference angle) θ is formed by the longitudinal axis (Y axis) Y1 of the main body 1 in a state that brush bristles 210 of the head portion 4 contact with the brushing site BP of the dentition 98U or 98L with respect to the longitudinal axis (Y axis) Y0 of the main body 1 in a state that the brush bristles 210 of the head portion 4 contact with the reference position BP0 of the dentition 98U. The control unit 110 obtains the difference angle θ based on the output (angular velocity) of the gyro sensor 16. Here, since the output of the gyro sensor 16 is an angular velocity, the difference angle θ can be obtained by first-order integration.

Note that the control unit 110 may perform the process of step S21 and the process of step S22 in FIG. 5 in parallel, or may perform the process of step S22 before the process of step S21.

iii) Next, as described in steps S23 and S24 of FIG. 5, the control unit 110 serves as a brushing site detection unit, sets a reference tangent line (corresponding to the x axis in this example) that contacts with the approximate curve E1 at the origin O corresponding to the reference position BP0 in the data space DS, and sets a movable tangent line Q that forms the difference angle θ with respect to the reference tangent line (x-axis) and contacts with the approximate curve E1, as illustrated in FIG. 9. Here, the movable tangent line Q is variably set as the difference angle θ changes, in other words, as the brushing site BP in the dentition 98U or 98L changes. Then, control unit 110 obtains a point where the movable tangent line Q contacts with the approximate curve E1 as a corresponding point P (step S25 in FIG. 5). Thereby, the corresponding point P on the approximate curve E1 can be obtained by a relatively simple process.

Specifically, as illustrated in FIG. 9, it is assumed that a certain movable tangent line Q contacts with the approximate curve E1 at a point P $(x_1, y_1)$. The equation of the movable tangent line Q can be expressed by a mathematical formula:

$$xx_1/a^2 + (y+b)(y_1+b)/b^2 = 1 \qquad \text{(Eq. 2)}$$

Further, since the point P $(x_1, y_1i)$ is a point on the ellipse E, the following equation is established:

$$(x_1/a)^2 + \{(y_1+b)/b\}^2 = 1 \qquad \text{(Eq. 3)}$$

Here, when the inclination of the movable tangent line Q is m, based on the equation (Eq. 2), m can be expressed as follows:

$$m = -b^2 x_1/a^2(y_1+b) \qquad \text{(Eq. 4)}$$

Using the equations (Eq. 3) and (Eq. 4), the coordinates $x_1, y_1$ of a contact point P with respect to the approximate curve E1 can respectively be expressed using the inclination m as follows:

$$x_1 = -a^2 m/\{a^2 m^2 + b^2\}^{1/2}$$

$$y_1 = -b + b^2/\{a^2 m^2 + b^2\}^{1/2} \qquad \text{(Eq. 5)}$$

Further, the angle formed by the movable tangent line Q with respect to the x-axis is considered as θ (assuming that the counterclockwise direction is positive, and $-\pi/2 \leq \theta \leq \pi/2$), and the inclination is expressed as inclination m=tan θ. Then, the equation (Eq. 5) is expressed as follows:

$$x_1 = -a^2(\tan \theta)/\{a^2(\tan \theta)^2 + b^2\}^{1/2}$$

$$y_1 = -b + b^2/\{a^2(\tan \theta)^2 + b^2\}^{1/2} \quad \text{(Eq. 6)}$$

According to this equation (Eq. 6), based on the difference angle θ in the real space RS, the coordinates $(x_1, y_1)$ of the corresponding point P corresponding to the brushing site BP on the approximate curve E1 in the data space DS are obtained. The coordinates $(x_1, y_1)$ of the corresponding point P are used as data representing the translational position of the brushing site BP. In this manner, the translational position of the brushing site BP can be easily obtained by using the analytical equation (Eq. 6). In particular, the equation (Eq. 6) is simplified by setting the center of the front surface of the dentition 98U as the reference position BP0. Note that the center of the front surface of the dentition 98L may be set as the reference position BP0.

In such a case, since the output of the gyro sensor 16 is an angular velocity, the vibration component from the drive unit 101 (motor 10) is hardly included as noise. Further, since the output of the gyro sensor 16 is an angular velocity, the difference angle θ can be obtained by first-order integration, and is hardly affected by noise in the calculation process. Therefore, the translational position of the brushing site BP in the dentition 98U or 98L can be obtained with high accuracy.

When the coordinates $(x_1, y_1)$ of the corresponding point P are obtained according to the above equation (Eq. 6), the translational position of the brushing site BP is determined which site of "left back tooth," "front tooth," or "right back tooth" in Table 1.

For example, when the difference angle θ in the real space RS is 60 degrees and accordingly the coordinates $(x_1, y_1)$ of the corresponding point P in the data space DS is nearly equal to (−25.0, −18.1) (The unit is mm), the translational position of the brushing site BP is in the "left back tooth" site. When the difference angle θ in the real space RS is 45 degrees and accordingly the coordinates $(x_1, y_1)$ of the corresponding point P in the data space DS is nearly equal to (−17.5, −8.2) (The unit is mm), the translational position of the brushing site BP is in the "front tooth" site. When the difference angle θ in the real space RS is −60 degrees and accordingly the coordinates $(x_1, y_1)$ of the corresponding point P in the data space DS is nearly equal to (25.0, −18.1) (The unit is mm), the translational position of the brushing site BP is in the "right back tooth" site.

(Determination of Which One of the Front, Rear, and Occlusal Surfaces is Being Brushed)

Next, the process of step S3 in FIG. 4 (processing to obtain the direction (+Z direction) that the brush bristles 210 of the head portion 4 are facing around the longitudinal axis (Y axis) of the main body 1 based on the output of the acceleration sensor 15 and to determine which one of the front, rear, and occlusal surfaces of the dentition 98U or 98L is being brushed according to the direction (+Z direction) in which the brush bristles 210 of the head portion 4 are facing) will be described in detail with reference to FIGS. 6 and 10 to 15.

Figure 11:
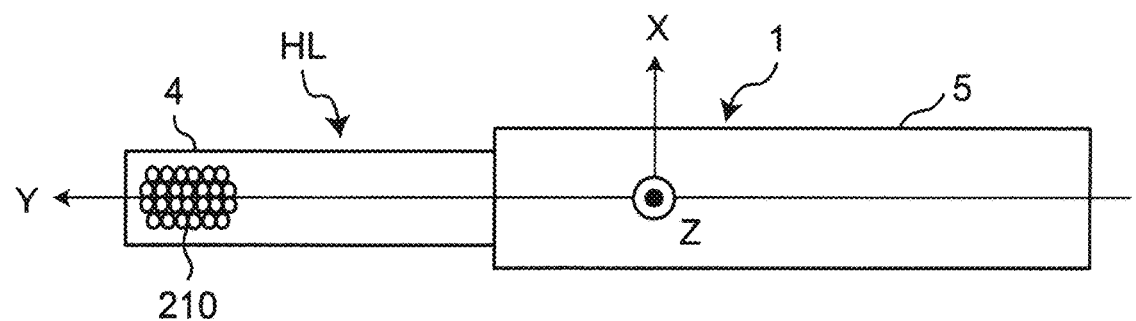
FIG. 11 is a diagram illustrating a state that the head portion (+Y direction) is arranged leftward with respect to the user's face, as viewed from the user.
Figure 12:
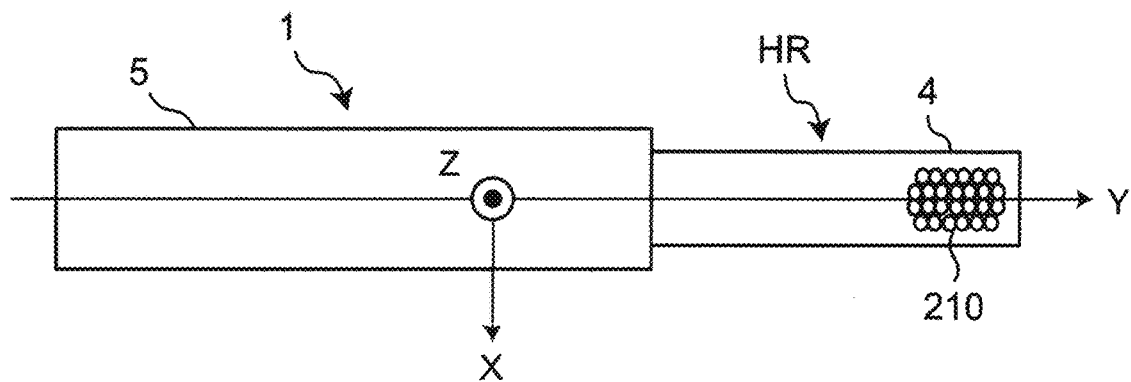
FIG. 12 is a diagram illustrating a state that the head portion (+Y direction) is arranged rightward with respect to the user's face, as viewed from the user.

In the brushing procedure described with reference to FIG. 6, brushing is performed in ascending order regarding the reference numerals, from the sites SQ1 to SQ8 in the maxillary dentition 98U and subsequently from the sites SQ9 to SQ16 in the mandibular dentition 98L. Furthermore, in the brushing procedure, when brushing each site SQ1 to SQ16, as indicated parentheses (HL) or (HR) in FIG. 6, it is assumed that the head portion 4 (+Y direction) is set to be directed leftward or rightward with respect to the user's face while the longitudinal axis (Y axis) of the main body 1 is kept horizontal. The symbol HL represents that the head portion 4 (+Y direction) is arranged leftward with respect to the user's face as illustrated in FIG. 11. On the other hand, the symbol HR represents that the head portion 4 (+Y direction) is arranged rightward with respect to the user's face as illustrated in FIG. 12. As can be seen from FIG. 6, when brushing the sites SQ1, SQ7, SQ8, SQ9, SQ15, and SQ16 that are classified as "left back teeth," the head portion 4 (+Y direction) is set to be arranged in the leftward HL. On the other hand, when brushing the sites SQ3, SQ4, SQS, SQ11, SQ12, and SQ13 that are classified as "right back teeth," the head portion 4 (+Y direction) is set to be arranged in the rightward HR. These settings are inevitably required when brushing the "left back tooth" and the "right back tooth," respectively. Further, when brushing the sites SQ2, SQ6, SQ10, and SQ14 that are classified as "front teeth," in this example, they are set in the same direction as the direction of brushing immediately preceding site respectively. In other words, when brushing the sites SQ2 and SQ10, the head portion 4 (+Y direction) is set to be arranged in the leftward direction HL. Further, when brushing the sites SQ6 and SQ14, the head portion 4 (+Y direction) is set to be arranged in the rightward direction HR.

Figure 10:
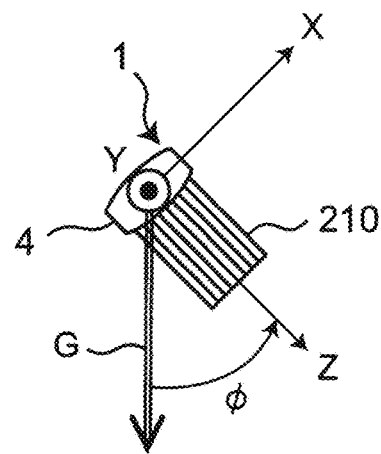
FIG. 10 is a diagram illustrating a direction of gravitational acceleration G output from an acceleration sensor when viewed from the head portion side (+Y direction) in a condition that the longitudinal axis (Y axis) of the main body is in a horizontal posture.

FIG. 10 illustrates the direction of the gravitational acceleration G output by the acceleration sensor 15 when viewed from the head portion 4 (+Y direction) in a condition that the longitudinal axis (Y axis) of the main body 1 is in a horizontal posture. As can be seen from FIG. 10, based on the direction of the gravitational acceleration G output from the acceleration sensor 15, the direction in which the brush bristles 210 of the head portion 4 are facing around the longitudinal axis (Y axis) of the main body 1 (+Z direction)) is expressed as a rotation angle φ around the longitudinal axis. In this example, it is assumed that the rotation angle φ around the longitudinal axis is 0 degree in the vertical downward direction, and takes values within a range between 0 degree to 359.99 degrees (up to 2 digits after the decimal point) in counterclockwise direction as seen from the head portion 4 (+Y direction) in a condition that the longitudinal axis (Y axis) of the main body 1 is in a horizontal posture as illustrated in FIG. 10.

Figure 13A:
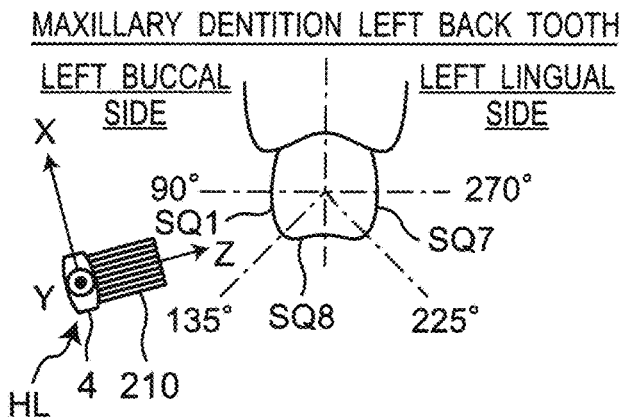
FIG. 13A is diagram illustrating classification for determining which one of a front surface, a rear surface, and an occlusal surface of "left back tooth" in a maxillary dentition is being brushed.
Figure 13B:
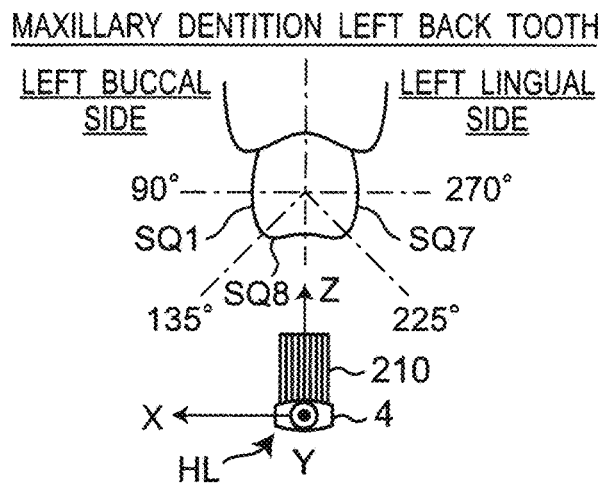
FIG. 13B is diagram illustrating classification for determining which one of a front surface, a rear surface, and an occlusal surface of "left back tooth" in a maxillary dentition is being brushed.
Figure 13C:
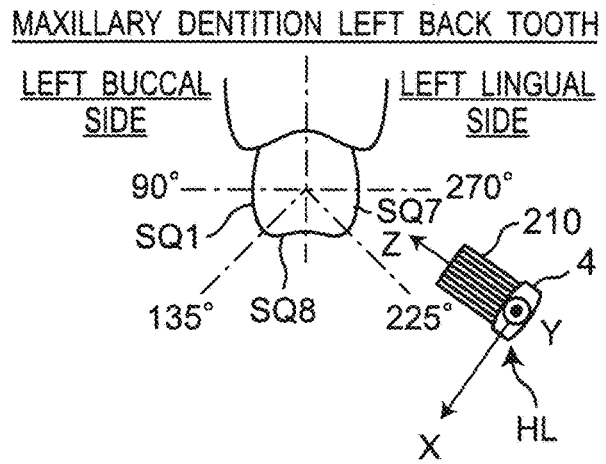
FIG. 13C is diagrams illustrating classification for determining which one of a front surface, a rear surface, and an occlusal surface of "left back tooth" in a maxillary dentition is being brushed.

FIGS. 13A to 13C illustrate the sites used when determining which one of the front, rear, and occlusal surfaces of the "left back tooth" in the maxillary dentition 98U is being brushed. In the state where the longitudinal axis (Y axis) of the main body 1 takes a horizontal posture, the head portion 4 (+Y direction) is arranged in the leftward HL with respect to the user's face, and the rotation angle φ around the longitudinal axis is within the range of 90 to 135 degrees as illustrated in FIG. 13A, it is determined that the front surface (which means the left buccal site) SQ1 is being brushed. In the same state, when the rotation angle φ around the longitudinal axis is within the range of 135 to 225 degrees as illustrated in FIG. 13B, it is determined that the occlusal surface (which means the left occlusal surfacite) SQ8 is being brushed. In the same state, when the rotation angle φ around the longitudinal axis is within the range of 225 to 270 degrees as illustrated in FIG. 13C, it is determined that the rear surface (which means the left linguaite) SQ7 is being brushed.

Figure 13D:
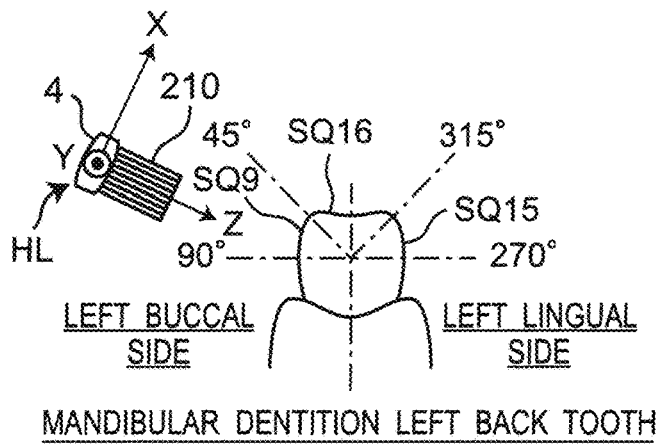
FIG. 13D is diagram illustrating classification for determining which one of a front surface, a rear surface, and an occlusal surface of "left back tooth" in a mandibular dentition is being brushed.
Figure 13E:
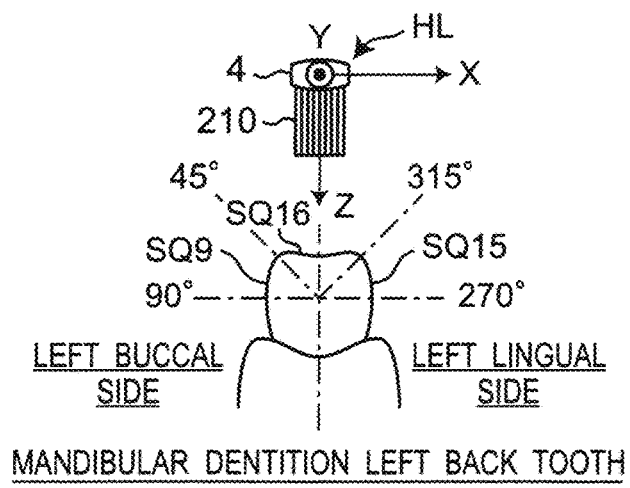
FIG. 13E is diagram illustrating classification for determining which one of a front surface, a rear surface, and an occlusal surface of "left back tooth" in a mandibular dentition is being brushed.
Figure 13F:
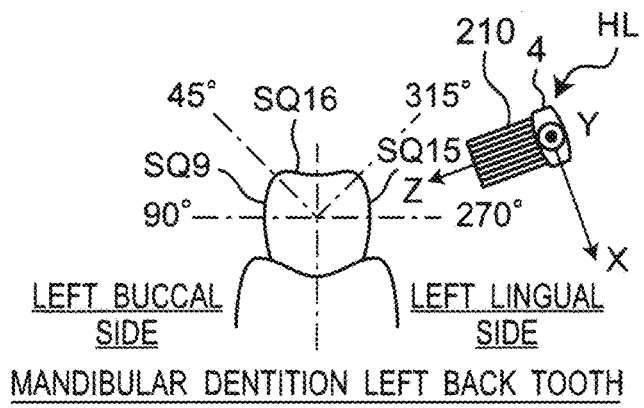
FIG. 13F is diagram illustrating classification for determining which one of a front surface, a rear surface, and an occlusal surface of "left back tooth" in a mandibular dentition is being brushed.

In the same manner, FIGS. 13D to 13F illustrate classifications used when determining which one of the front, rear, and occlusal surfaces of the "left back tooth" in the mandibular dentition 98L is being brushed. In the state where the longitudinal axis (Y axis) of the main body 1 takes a horizontal posture, the head portion 4 (+Y direction) is arranged leftward HL with respect to the user's face, and the rotation angle φ around the longitudinal axis is within the range of 45 to 90 degrees as illustrated in FIG. 13D, it is determined that the front surface (which means the left buccal site) SQ9 is being brushed. In the same state, the rotation angle φ around the longitudinal axis is within the range of 0 to 45 degrees or 315 to 359.99 degrees as illustrated in FIG. 13E, it is determined that the occlusal surface (which means the left occlusal surface site) SQ16 is being brushed. In the same state, the rotation angle φ around the longitudinal axis is within the range of 270 to 315 degrees as illustrated in FIG. 13F, it is determined that the rear surface (which means the t lingual site) SQ15 is being brushed.

Figure 14A:
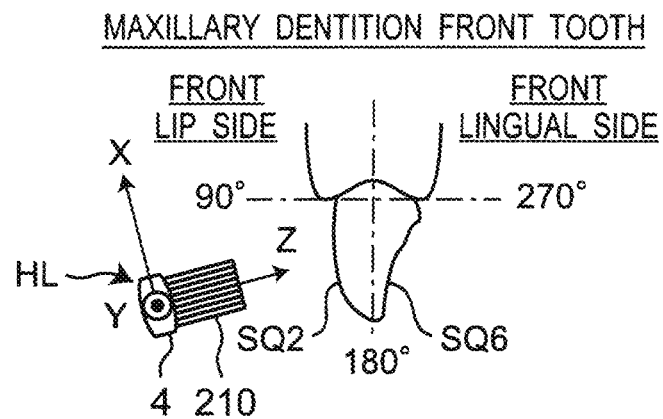
FIGS. 14A and 14B are diagrams illustrating classification for determining which one of a front surface and a rear surface of "front tooth" in the maxillary dentition is being brushed.
Figure 14B:
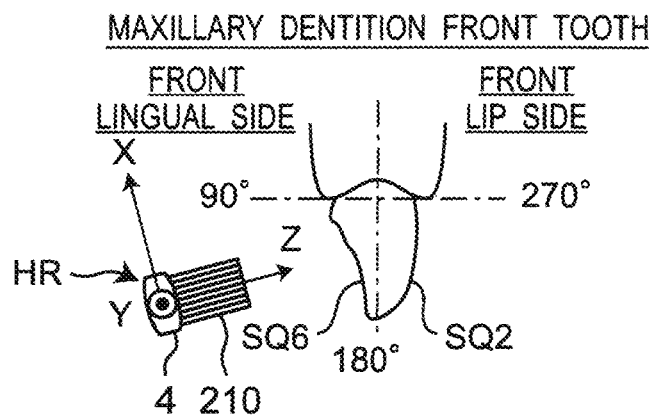

FIGS. 14A and 14B illustrate sites used when determining which one of the front and rear surfaces of the "front tooth" of the maxillary dentition 98U is being brushed. In a state where the longitudinal axis (Y axis) of the main body 1 takes a horizontal posture, the head portion 4 (+Y direction) is arranged leftward HL with respect to the user's face, and the rotation angle φ around the longitudinal axis is within the range of 90 to 180 degrees as illustrated in FIG. 14A, it is determined that the front surface (which means the front lip site) SQ2 is being brushed. In the same state, when the rotation angle φ around the longitudinal axis is within the range of 180 to 270 degrees, which is outside the brushing procedure, it is determined that the rear surface (and hence the front lingual site) SQ6 is being brushed. On the other hand, in a state that the longitudinal axis (Y axis) of the main body 1 takes a horizontal posture, the head portion 4 (+Y direction) is arranged in the rightward HR with respect to the user's face, and the rotation angle φ around the longitudinal axis is within the range of 90 to 180 degree as illustrated in FIG. 14B, it is determined that the rear surface (which means the front lingual site) SQ6 is being brushed. Here, in this state, if the rotation angle φ around the longitudinal axis is within the range of 180 to 270 degrees outside the brushing procedure, it is determined that the front surface (and hence the front lip site) SQ2 is being brushed.

Figure 14C:
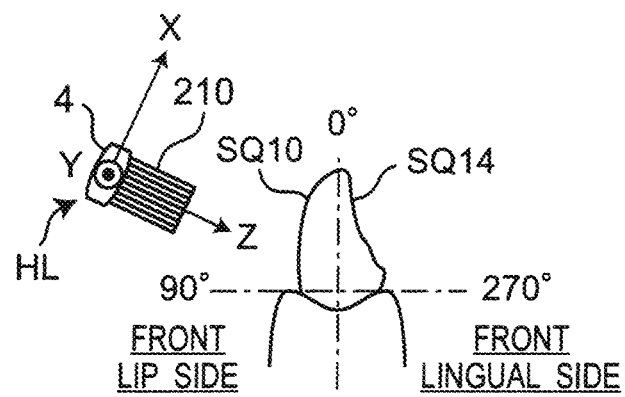
FIGS. 14C and 14D are diagrams illustrating classification for determining which one of a front surface and a rear surface of "front tooth" in the mandibular dentition is being brushed.
Figure 14D:
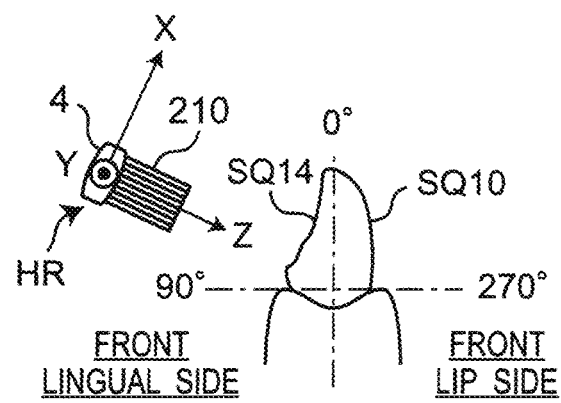

In the same manner, FIGS. 14C and 14D illustrate sites used when determining which one of the front and rear surfaces of the "front teeth" of the mandibular dentition 98L is being brushed. In a state where the longitudinal axis (Y axis) of the main body 1 takes a horizontal posture, the head portion 4 (+Y direction) is arranged leftward HL with respect to the user's face, and the rotation angle φ around the longitudinal axis is within the range of 0 to 90 degrees as illustrated in FIG. 14C, it is determined that the front surface (which means the front lip site) SQ10 is being brushed. Here, in the same state, when the rotation angle φ around the longitudinal axis is within the range of 270 to 359.99 degrees, which is outside the brushing procedure, it is determined that the rear surface (which means the front lingual site) SQ14 is being brushed. On the other hand, in a state where the longitudinal axis (Y axis) of the main body 1 takes a horizontal posture, the head portion 4 (+Y direction) is arranged in the rightward HR with respect to the user's face, the rotation angle φ around the longitudinal axis is within the range of 0 to 90 degrees as illustrated in FIG. 14D, it is determined that the rear surface (which means the front lingual site) SQ14 is being brushed. Here, in the same state, when the rotation angle φ around the longitudinal axis is within the range of 270 to 359.99 degrees outside the brushing procedure, it is determined t the front surface (which means the front lip site) SQ10 is being brushed.

Figure 15A:
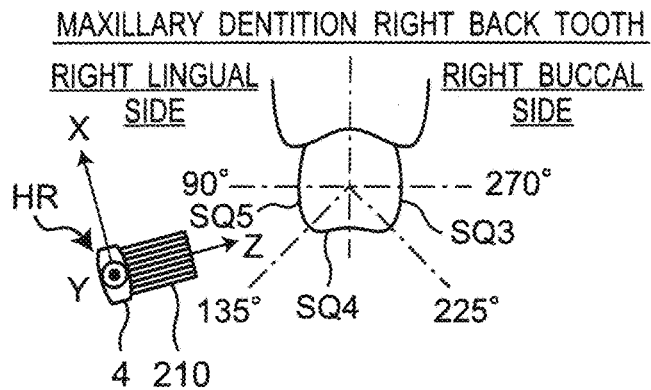
FIG. 15A is diagram illustrating classification for determining which one of a front surface, a rear surface, and an occlusal surface of "right back tooth" in the maxillary dentition is being brushed.
Figure 15B:
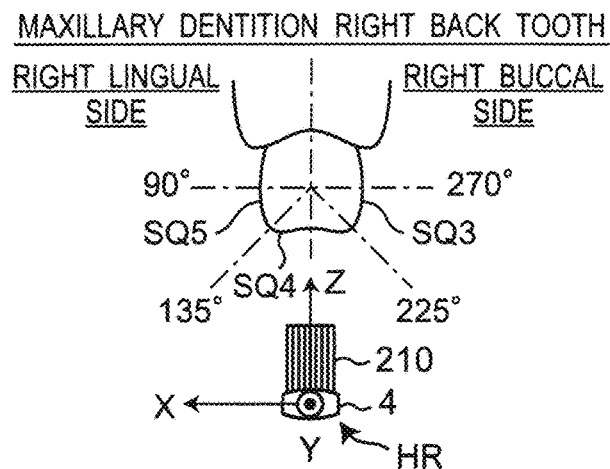
FIG. 15B is diagram illustrating classification for determining which one of a front surface, a rear surface, and an occlusal surface of "right back tooth" in the maxillary dentition is being brushed.
Figure 15C:
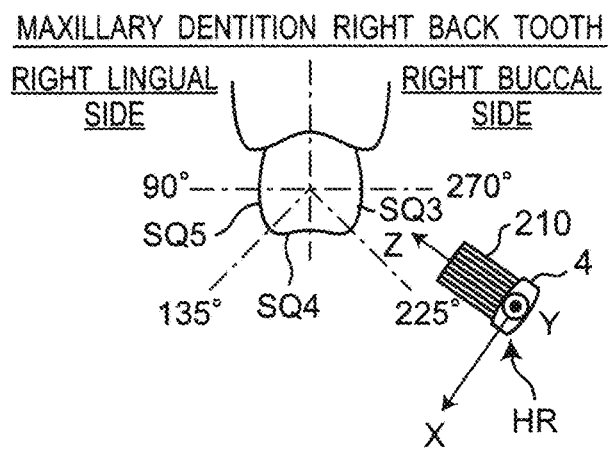
FIG. 15C is diagram illustrating classification for determining which one of a front surface, a rear surface, and an occlusal surface of "right back tooth" in the maxillary dentition is being brushed.

FIGS. 15A to 15C illustrate sites used when determining which one of the front, rear, and occlusal surfaces of the "right back tooth" in the maxillary dentition 98U is being brushed. In a state where the longitudinal axis (Y axis) of the main body 1 takes a horizontal posture, the head portion 4 (+Y direction) is arranged in the rightward HR with respect to the user's face, the rotation angle φ around the longitudinal axis is in the range of 90 to 135 degrees as illustrated in FIG. 15A, it is determined that the rear surface (which means the right lingual site) SQ5 is being brushed. In the same state, when the rotation angle φ around the longitudinal axis is within the range of 135 to 225 degrees as illustrated in FIG. 15B, it is determined that the occlusal surface (which means the right occlusal surface site) SQ4 is being brushed. In the same state, when the rotation angle φ around the longitudinal axis is within the range of 225 to 270 degrees as illustrated in FIG. 15C, it is determined that the front surface (which means the right buccal site) SQ3 is being brushed.

Figure 15D:
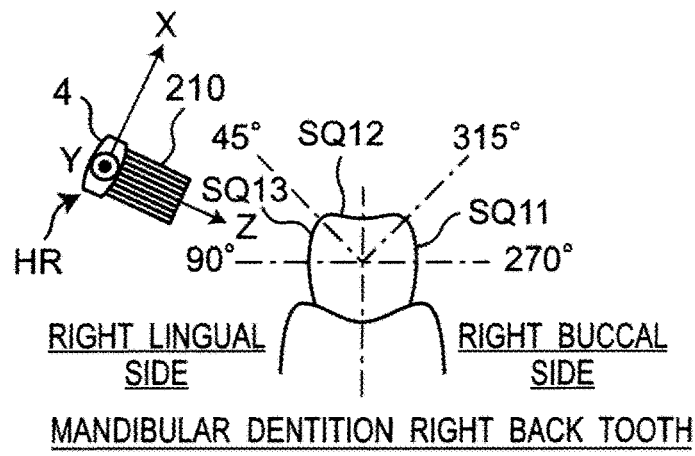
FIG. 15D is diagram illustrating classification for determining which one of a front surface, a rear surface, and an occlusal surface of "right back tooth" in the mandibular dentition is being brushed.
Figure 15E:
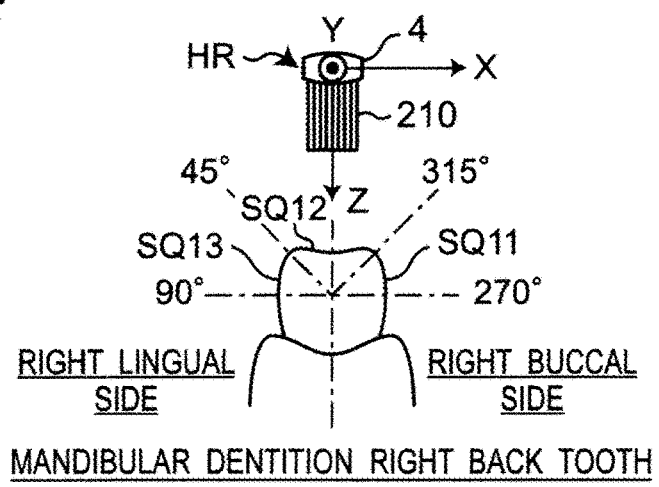
FIG. 15E is diagram illustrating classification for determining which one of a front surface, a rear surface, and an occlusal surface of "right back tooth" in the mandibular dentition is being brushed.
Figure 15F:
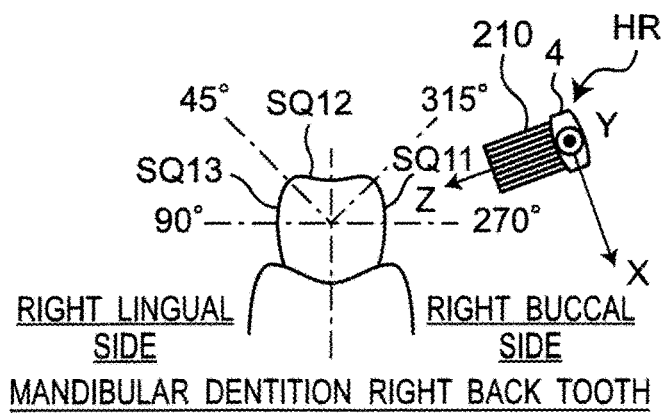
FIG. 15F is diagram illustrating classification for determining which one of a front surface, a rear surface, and an occlusal surface of "right back tooth" in the mandibular dentition is being brushed.

In the same manner, FIGS. 15D to 15F illustrate sites used when determining which one of the front, rear, and occlusal surfaces of the "right back tooth" in the mandibular dentition 98L is being brushed. In a state where the longitudinal axis (Y axis) of the main body 1 takes a horizontal posture, the head portion 4 (+Y direction) is arranged in the rightward HR with respect to the user's face, and the rotation angle φ around the longitudinal axis is within the range of 45 to 90 degrees as illustrated in FIG. 15D, it is determined that the rear surface (which means the right lingual site) SQ13 is being brushed. In the same state, when the rotation angle φ around the longitudinal axis is within the range of 0 to 45 degrees or 315 to 359.99 degrees as illustrated in FIG. 15E, it is determined that the occlusal surface (which means the right occlusal surface site) SQ12 is being brushed. In the same state, when the rotation angle φ around the longitudinal axis is within the range of 270 to 315 degrees as illustrated in FIG. 15F, the front surface (which means the right buccal site) SQ11 is being brushed.

In summary, the correspondence relationship between the rotation angle φ around the longitudinal axis and the front, rear, and occlusal surfaces can be described as following Table 2. Here, the table body of Table 2 indicates the rotation angle φ around the longitudinal axis in a state that the head portion 4 (+Y direction) is arranged in the leftward HL or rightward HR. The side of Table 2 represents the front, occlusal, and rear surfaces of the "left back tooth" and the front and rear surfaces of the "front tooth," and the front, occlusal, and rear surfaces of the "right back tooth" of the maxillary dentition 98U or the mandibular dentition 98L, corresponding to the rotation angle φ around the longitudinal axis. The symbol "-" in the body of Table 2 indicates that brushing cannot be performed. The rotation angle φ in parentheses ( ) indicates that brushing may occur but is outside the above described brushing procedure.

TABLE 2

Correspondence relationship between rotation angle φ around the longitudinal axis and front, rear, and occlusal surfaces

| Classification of sites | | | Head portion orientation with respect to user's face | |
|---|---|---|---|---|
| | | | Facing leftward HL | Facing rightward HR |
| Maxillary dentition | Left back tooth | Front surface | 90 to 135 degrees | — |
| | | Occlusal surface | 135 to 225 degrees | — |
| | | Rear surface | 225 to 270 degrees | — |
| | Front tooth | Front surface | 90 to 180 degrees | (180 to 270 degrees) |
| | | Rear surface | (180 to 270 degrees) | 90 to 180 degrees |
| | Right back tooth | Front surface | — | 225 to 270 degrees |
| | | Occlusal surface | — | 135 to 225 degrees |
| | | Rear surface | — | 90 to 135 degrees |
| Mandibular dentition | Left back tooth | Front surface | 45 to 90 degrees | — |
| | | Occlusal surface | 0 to 45 degrees or 315 to 359.99 degrees | — |
| | | Rear surface | 270 to 315 degrees | — |
| | Front tooth | Front surface | 0 to 90 degrees | (270 to 359.99 degrees) |
| | | Rear surface | (270 to 359.99 degrees) | 0 to 90 degrees |
| | Right back tooth | Front surface | — | 270 to 315 degrees |
| | | Occlusal surface | — | 0 to 45 degrees or 315 to 359.99 degrees |
| | | Rear surface | — | 45 to 90 degrees |

As described in Table 2, it can be determined which one of the front, rear, and occlusal surfaces of the dentition 98U or 98L is being brushed according to the rotation angle φ around the longitudinal axis representing the direction that the brush bristles 210 of the head portion 4 are facing (+Z direction).

As described above, the control unit 110 can obtain the direction (+Z direction) that the brush bristles 210 of the head portion 4 face around the longitudinal axis (Y axis) of the main body 1 as a rotation angle φ around the longitudinal axis based on the output of the acceleration sensor 15, and determine which one of the front, rear, and occlusal surfaces of the dentition 98U or 98L is being brushed according to the rotation angle φ around the longitudinal axis.

Therefore, as described above, the control unit 110 can specify a brushing site BP in the dentition 98U or 98L according to a combination of the translational position of the brushing site BP obtained based on the output of the gyro sensor 16 and the determination result of which one of the front, rear, or occlusal surfaces of the dentition 98U or 98L is being blushed. Thereby, the brushing site BP in the dentition 98U or 98L can be specified with high accuracy.

Note that, for left-handed users, it is desirable to switch the right and left in the entire brushing procedure described above.

(Correction Process)

Figure 16:
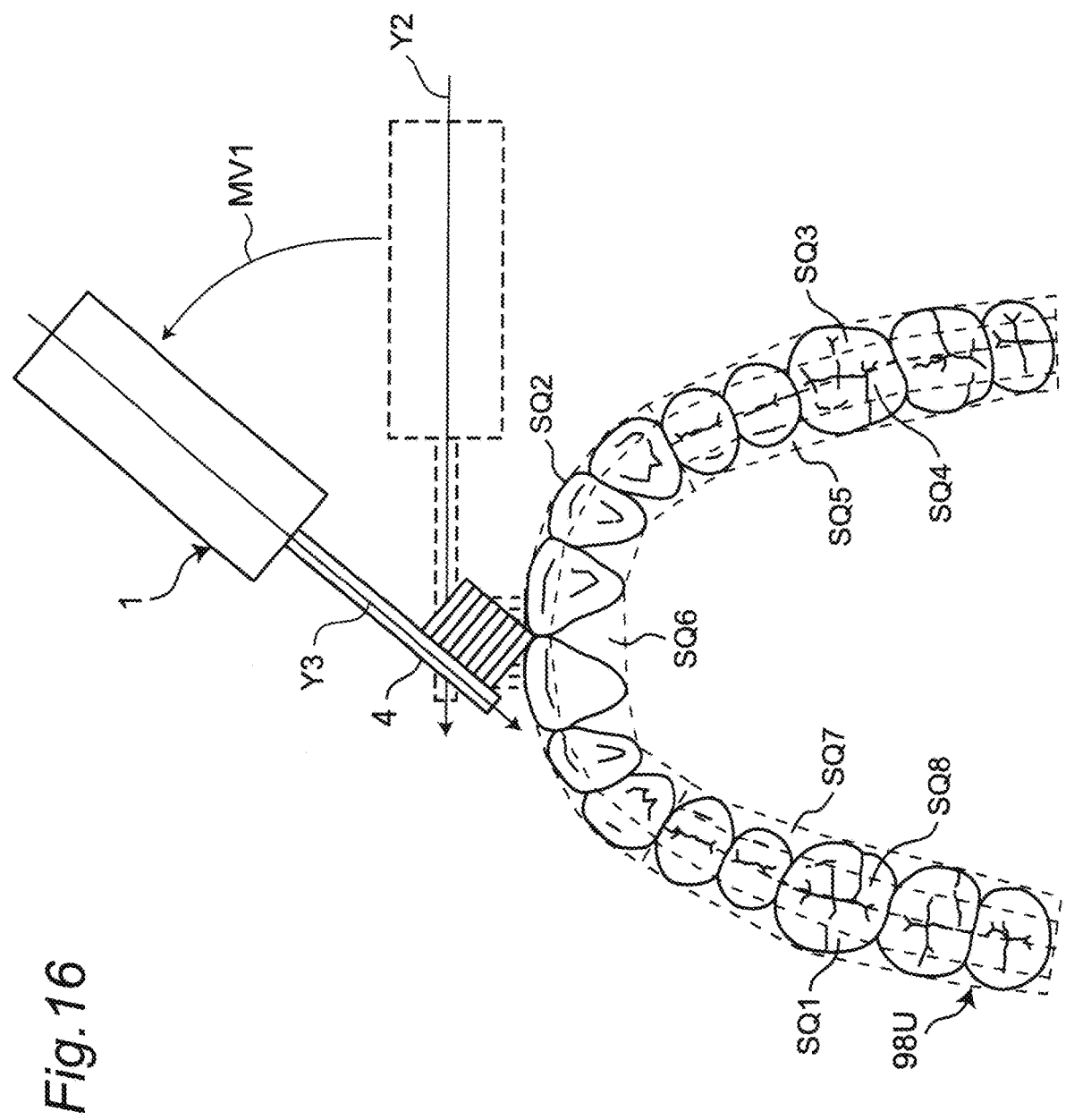
FIG. 16 is a diagram exemplifying a mode in which a user who is brushing his/her teeth makes a significant change in the direction of the longitudinal axis (Y axis) of the main body in a state where the translational movement of the head portion is almost stopped.

In the brushing procedure described with reference to FIG. 6, as indicated by the arrows HCG1, HCG2, HCG3, HCG4 in the drawing, when shifting from the site SQ2 to the site SQ3, shifting from the site SQ6 to the site SQ7, shifting from the site SQ10 to the site SQ11, shifting from the site SQ14 to the site SQ15 in the dentition 98U or 98L, the direction of the longitudinal axis (Y axis) of the main body 1 is significantly changed from leftward HL to rightward HR or vice versa from rightward HR to leftward HL respectively, with the translational movement of the head portion 4 almost stopped. Also, as illustrated in FIG. 16, regardless of the above described brushing procedure, the user who is brushing his or her teeth may significantly change the orientation of the longitudinal axis (Y axis) of the main body 1 from Y2 to Y3 as indicated by the arrow MV1 for example, in a state that the translational movement of the head portion 4 is almost stopped. When the orientation of the longitudinal axis (Y-axis) of the main body 1 is significantly changed while the translational movement of the head portion 4 is almost stopped in this manner, an error occurs in the process of step S2 described in FIG. 4 (the process to obtain a translational position of a brushing site based on an output of the gyro sensor 16).

Figure 17:
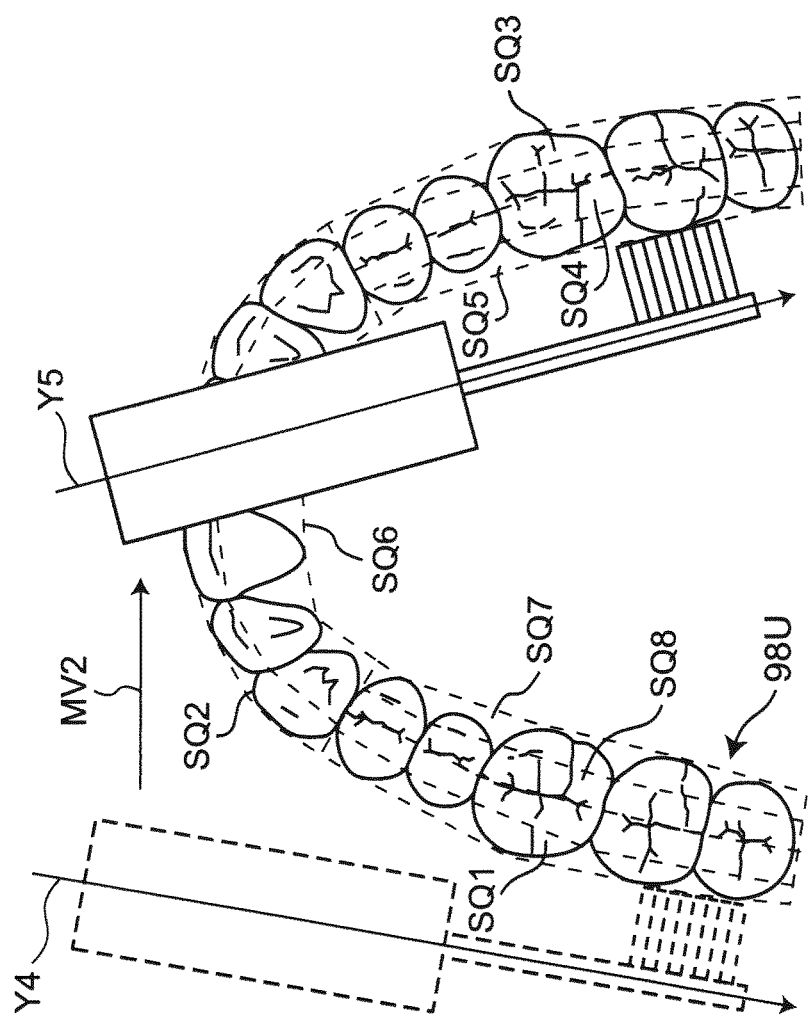
FIG. 17 is a diagram exemplifying a mode in which a user who is brushing his/her teeth switches the site to another site and makes a large translational movement of the main body without changing the orientation of the longitudinal axis (Y axis) of the main body.

In addition, as illustrated in FIG. 17 for example, there may be a case where the user who is brushing his or her teeth makes a large translational movement of the main body 1, for example, from the left buccal site SQ1 to the right lingual site SQ5 across the sites in the maxillary dentition 98U as indicated by the arrow MV2 with little change in the direction of the longitudinal axis (Y axis) of the main body 1, regardless of the above described brushing procedure. When a large translational movement of the main body 1 is made across the sites with little change in the orientation of the longitudinal axis (Y axis) of the main body 1 in this manner, an error occurs in the process of step S2 described in FIG. 4 (the process to obtain a translational position of a brushing site based on an output of the gyro sensor 16).

Figure 18:
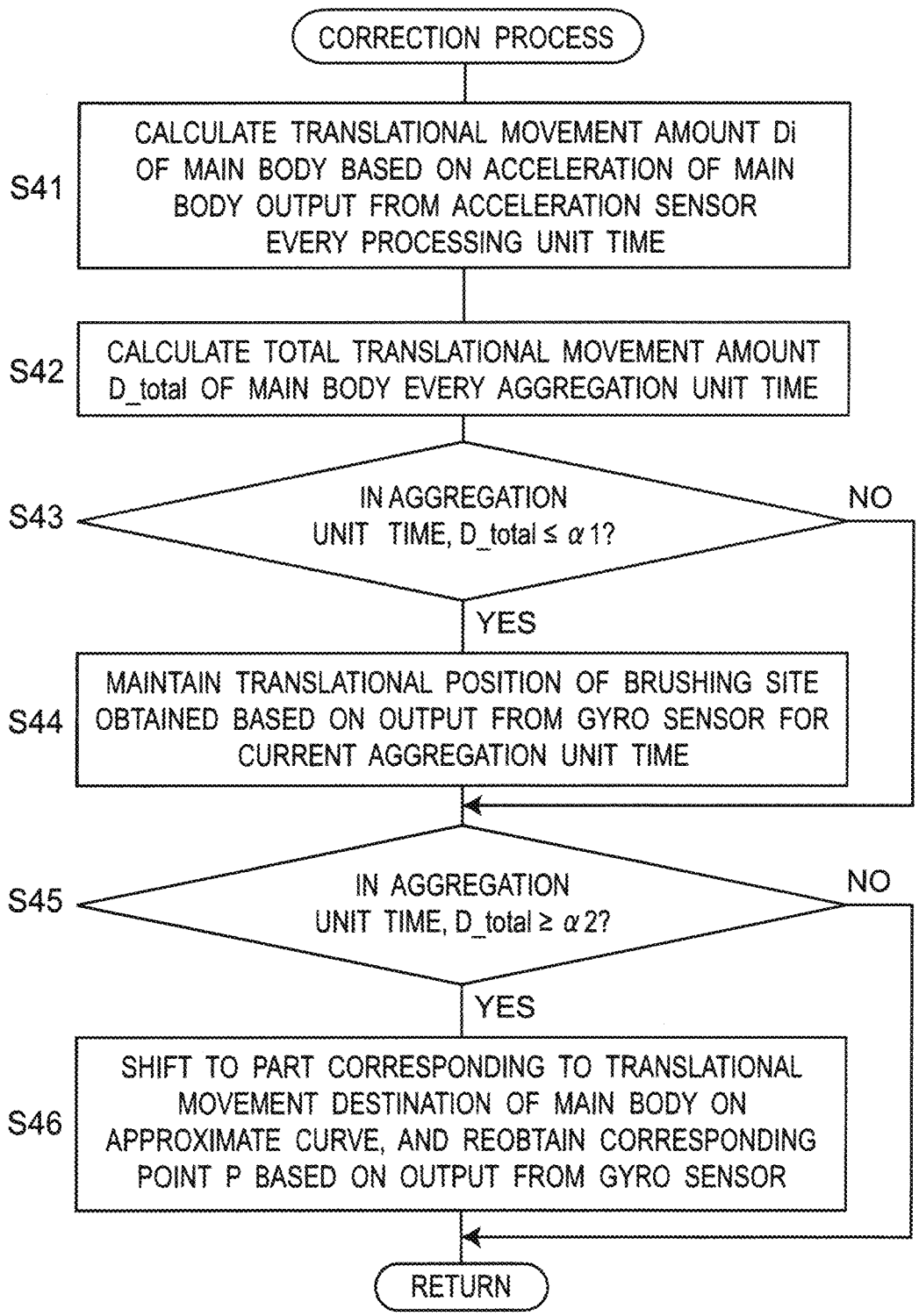
FIG. 18 is a diagram illustrating a flow of a correction process.

Therefore, in this example, the control unit 110 performs a correction process described in the flow of FIG. 18 while repeating the processes in steps S2 to S5 in FIG. 4.

In other words, as described in step S41 of FIG. 18, the control unit 110 performs second-order integration based on the acceleration of the main body 1 output from the acceleration sensor 15 every 0.1 seconds, which is the processing unit time, and obtains a translational movement amount of the main body 1. Note that the accelerations in the directions of the three axes of the main body 1 are respectively represented by Acc_X, Acc_Y, and Acc_Z, the velocities in directions of the three axes are respectively represented by v_X, v_Y, and v_Z, and the translational movement amount of the main body 1 in the directions of the three axes are respectively represented by D_X, D_Y, and D_Z. Then, the translational movement amount Di (where i=1, 2, 3, . . . ) of the main body 1 for each processing unit time is obtained by the following equations (Eq. 7), (Eq. 8), and (Eq. 9).

$$v\_X = \int (Acc\_X) dt$$

$$v\_Y = \int (Acc\_Y) dt$$

$$v\_Z = \int (Acc\_Z) dt \quad \text{(Eq. 7)}$$

$$D\_X = \int (v\_X) dt$$

$$D\_Y = \int (v\_Y) dt$$

$$D\_Z = \int (v\_Z) dt \quad \text{(Eq. 8)}$$

$$Di = (D\_X) + (D\_Y) + (D\_Z) \quad \text{(Eq. 9)}$$

Next, as described in step S42, the control unit 110 aggregates the translational movement amount Di of the main body 1 every 0.5 seconds, which is a predetermined aggregation unit time. Here, assuming that the translational movement amount Di for each processing unit time is expressed as D1, D2, D3, D4, and D5 respectively, the total translational movement amount D_total for a certain aggregation unit time is obtained by the following equation (Eq. 10).

$$D\_total = D1 + D2 + D3 + D4 + D5 \quad \text{(Eq. 10)}$$

Next, as described in step S43, the control unit 110 determines whether or not the total translational movement amount D_total is equal to or less than a predetermined first threshold value α1 for a certain aggregation unit time. In this example, α1=20 mm is set. Here, when D_total≤α1 (YES in step S43), the process proceeds to step S44, and the control unit 110 maintains the translational position of the brushing site BP obtained based on the output of the gyro sensor 16 during the aggregation unit time (a first correction process).

In this case, when the user who is brushing his/her teeth significantly changes the orientation of the longitudinal axis (Y axis) of the main body 1 with little translational movement of the main body 1 (particularly the head portion 4), as illustrated in FIG. 16 for example, the translational position of the brushing site BP obtained based on the output of the gyro sensor 16 is maintained before and after the change. Thereby, the accuracy of the obtained translational position of the brushing site BP can be maintained.

In addition, when the dentition is divided into smaller sites than those in Table 1, that is, when divided into individual teeth along the dental arch or when each individual tooth is divided into right and left halves for example, it is desirable to set the value of the first threshold value α1 smaller accordingly, for example, 10 mm or 5 mm.

On the other hand, when the total translational movement amount D_total exceeds the first threshold value α1 in step S43 in FIG. 18 (NO in step S43), the control unit 110 proceeds the process to step S45, and the control unit 110 determines whether or not the translational movement amount D_total is equal to or greater than a predetermined second threshold value α2 for the aggregation unit time. In this example, α2 is greater than α1 and α2=30 mm is set. Here, when D_total≥α2 (YES in step S45), the control unit 110 proceeds the process to step S46, and the control unit 110 shifts to a position on the approximate curve E1 in the data space DS corresponding to the translational movement destination of the main body 1, and recalculates the corresponding point P based on the output of the gyro sensor 16 (a second correction process).

For example, when the main body 1 is significantly moved across the sites from the left buccal site SQ1 to the right lingual site SQ5 in the maxillary dentition 98U for example with little change in the orientation of the longitudinal axis (Y axis) of the main body 1 as illustrated in FIG. 17, the control unit 110 shifts from a position where the x coordinate is near −a to a position where the x coordinate is near +a on the approximate curve E1 in the data space DS illustrated in FIG. 9, and recalculates the corresponding point P based on the output (a difference angle θ) of the gyro sensor 16.

In this case, the translational position of the brushing site BP in the dentition 98U or 98L can be obtained with high accuracy.

In this example, the second-order integration is performed based on the output of the acceleration sensor 15, and the translational movement amount Di of the main body 1 for each processing unit time is calculated. For this reason, the calculated total translational movement amount D_total of the main body 1 may not be accurate due to the influence of noise. However, the calculated total translational movement amount D_total of the main body 1 can be sufficient to determine whether the translational movement amount of the main body 1 (particularly, the head portion 4) is little (step S43 in FIG. 18) or extremely large (step 45 in FIG. 18).

When α1<D_total<α2 (NO in step S43 in FIG. 18 and NO in step S45 in FIG. 18), the control unit 110 determines that there is no need for correction, and the process returns to the flow of FIG. 4 (steps S2 to S5).

Figure 7B:
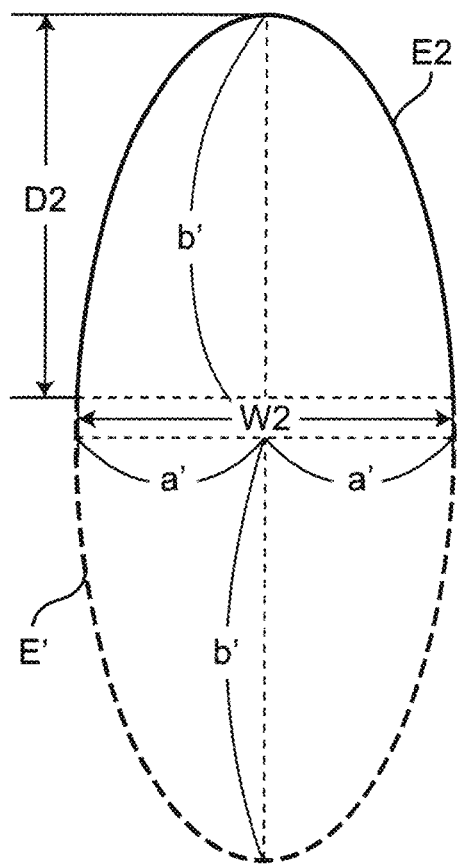
FIG. 7B is a diagram illustrating a "long" approximate curve that is a part of another ellipse.
Figure 7C:
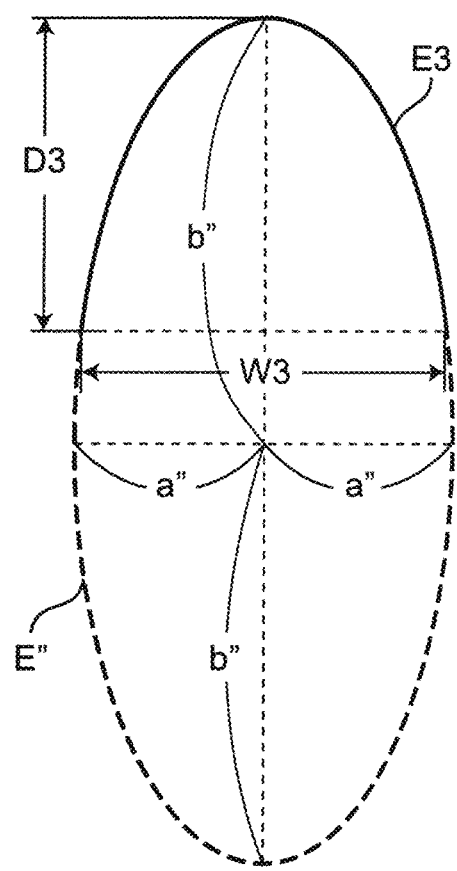
FIG. 7C is a diagram illustrating a "small" approximate curve that is a part of another ellipse.

In the above example, in order to obtain the translational position of the brushing site BP, the "standard" approximate curve E1 which is a part of the ellipse E illustrated in FIG. 7A is used. However, the present invention is not limited to this example. For example, for a user having a "long" dentition that is longer and narrower than the "standard" dentition, a part having a depth D2≈60 mm and a width W2≈60 mm in the ellipse E' with a minor axis 2a'=60.43 mm and a major axis 2b'=136.2 mm may be used as an approximate curve E2 as illustrated in FIG. 7B. For a user having a "small" dentition compared to the "standard" dentition, a part having a depth D3≈50 mm and a width W3≈60 mm in the ellipse E" having a minor axis 2a"=62.21 mm and a major axis 2b"=135.9 mm may be used as an approximate curve E3 as illustrated in FIG. 7C. Selection of these "standard" approximate curve E1, "long" approximate curve E2, or "small" approximate curve E3 (including the setting of the minor axis and major axis) is performed by a setting parameter from outside of the main body 1 via the communication unit 180 serving as a receiving unit in this example. In such a case, the approximate curve can be appropriately set according to sizes and shapes of various users' dental arches. Thereby, the translational position of the brushing site BP in the dentition can be obtained with higher accuracy.

Further, the actual brushing time data for each site acquired by the control unit 110 and other data related to brushing may be transmitted to the outside of the main body 1 via the communication unit 180 serving as a transmission unit. In this case, for example, the data can be received by a computer device provided outside the main body 1 and be used for various processes and applications.

(Another Approximate Curve)

In the above described embodiment, the subject's dental arch in the real space RS is approximated by a curve (approximate curve E1, E2 or E3) equivalent to a part of the ellipse E in the data space DS; however, the present invention is not limited to this example.

Figure 19:
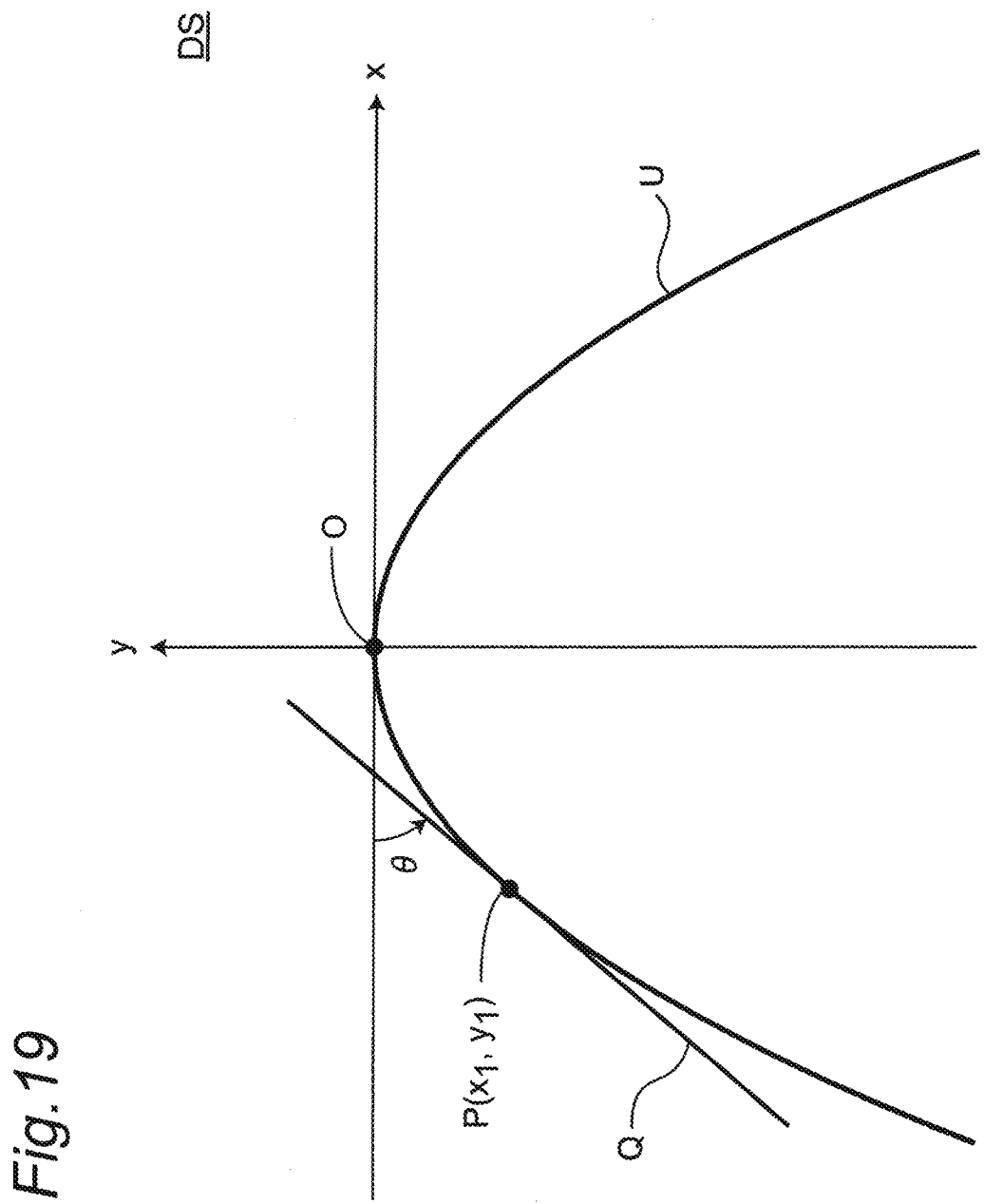
FIG. 19 is a diagram illustrating a process for obtaining a corresponding point corresponding to a brushing site on a parabola as an approximate curve in a data space based on the difference angle θ.

As illustrated in FIG. 19, the dental arch of the subject in the real space RS may be approximated by a parabola U in the data space DS. For convenience, it is assumed that the parabola U contacts with the x axis at the origin O (0, 0) in a convex manner.

The parabola U that contacts with the x-axis in a convex manner at the origin O (0, 0), where p is a negative coefficient (i.e., p<0), is expressed as:

$$4py = x^2 \quad \text{(Eq. 11)}$$

It is assumed that a certain movable tangent line Q contacts with the parabola U at the point P ($x_1$, $y_1$). The equation of the movable tangent line Q is expressed by the mathematical formula:

$$2p(y+y_1) = xx_1 \quad \text{(Eq. 12)}$$

Further, since the point P ($x_1$, $y_1$) is a point on the parabola U, the following equation is established.

$$4py_1 = x_1^2 \quad \text{(Eq. 13)}$$

Here, when the inclination of the movable tangent line Q is m, based on the equation (Eq. 12), the inclination is expressed as follows.

$$m = x_1/2p \quad \text{(Eq. 14)}$$

When the coordinates $x_1$ and $y_1$ of the contact point P with respect to the parabola U are expressed by the inclination m using the equations (Eq. 13) and (Eq. 14), the coordinates are respectively expressed as follows.

$$x_1 = 2\,pm$$

$$y_1 = pm^2 \quad \text{(Eq. 15)}$$

Further, the angle formed by the movable tangent line Q with respect to the x-axis is considered as θ (assuming that the counterclockwise direction is positive, and $-\pi/2 \leq \theta \leq \pi/2$), and the inclination is expressed as inclination m=tan θ. Then, the equation (Eq. 15) is expressed as follows.

$$x_1 = 2p(\tan\theta)$$

$$y_1 = p(\tan\theta)^2 \quad \text{(Eq. 16)}$$

According to this equation (Eq. 16), the coordinates ($x_1$, $y_1$) of the corresponding point P corresponding to the brushing site BP on the parabola U in the data space DS are obtained based on the difference angle θ in the real space RS.

In this case, an approximate curve can be set by determining a coefficient p. Therefore, the process for obtaining the corresponding point P can be easily performed.

(System)

Figure 20:
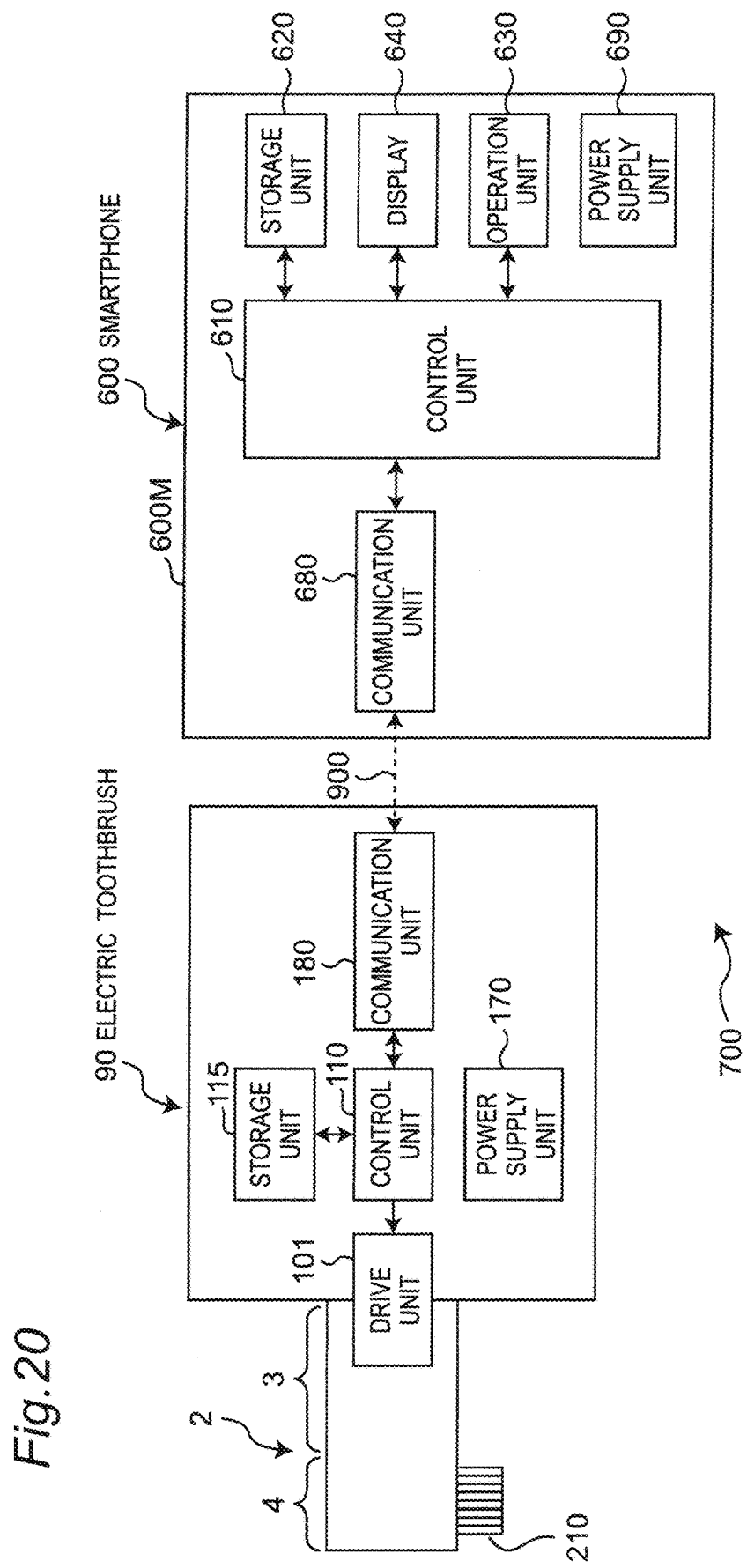
FIG. 20 is a diagram illustrating a configuration of a system including the electric toothbrush and a smartphone.

FIG. 20 illustrates a configuration of a system (the entire system is denoted by reference numeral 700) including the above-described electric toothbrush 90 and a smartphone 600. This system 700 includes the electric toothbrush 90 and the smartphone 600 as a computer device which are communicable with each other via a network 900.

The smartphone 600 includes a main body 600M and a control unit 610, a storage unit 620, an operation unit 630, a display 640, a communication unit 680, and a power supply unit 690, which are mounted on the main body 600M. The smartphone 600 is a commercially available smartphone in which later described application software has been installed.

The control unit 610 includes a CPU and its auxiliary circuit, controls each unit of smartphone 600, and executes processing in accordance with programs and data stored in the storage unit 620. For example, the data input from the communication unit 680 is processed based on an instruction input via the operation unit 630, and the processed data is stored in the storage unit 620, displayed on the display 640, or output via the communication unit 680.

The storage unit 620 includes a random access memory (RAM) used as a work area necessary for executing the program by the control unit 610, and a read only memory (ROM) for storing a basic program to be executed by the control unit 610. Further, as a storage medium of an auxiliary storage device for assisting the storage area of the storage unit 620, a semiconductor memory (memory card), a solid state drive (SSD) or the like may be used.

In this example, the operation unit 630 includes a touch panel provided on the display 640. Note that a keyboard or other hardware operation device may be included.

In this example, the display 640 includes a display screen composed of a liquid crystal display element (LCD) or an organic electroluminescence (EL) display. The display 640 displays various images on the display screen according to control by the control unit 610.

The communication unit 680 can perform wireless communication (for example, BT communication, BLE communication, and the like) with the electric toothbrush 90 via the network 900 under the control of the control unit 610.

The power supply unit 690 includes a rechargeable battery in this example, and supplies power to each unit of the smartphone 600.

It is assumed that the user installs application software (referred to as an "electric toothbrush program") in the smartphone 600 in advance. This electric toothbrush program wirelessly communicates with the electric toothbrush 90, makes various settings related to the brushing procedure and the like to the electric toothbrush 90, receives data specifying the brushing site BP, a translational position (coordinate value) of the brushing site, the direction in which the brush bristles 210 of the head portion 4 are facing, the output value of the gyro sensor or the acceleration sensor, and the like from the electric toothbrush 90, and uses the received data in various processes.

(Approximate Curve Setting)

For example, it is assumed that the user activates the electric toothbrush program and selects the "electric toothbrush setting" mode via the operation unit 630. Then, an "approximate curve setting" screen is displayed on the display 640, and the "standard" approximate curve E1 (a part having a depth D1≈50 mm and a width W1≈70 mm in the ellipse E with a minor axis 2a=71.76 mm and a major axis 2b=128.2 mm) and the "long" approximate curve E2 (a part having a depth D2≈60 mm and a width W2≈60 mm in the ellipse E' with a minor axis 2a'=60.43 mm and a major axis 2b'=136.2 mm) and the "small" approximate curve E3 (a part having a depth D3≈50 mm and a width W3≈60 mm in the ellipse E" with a minor axis 2a"=62.21 mm and a major axis 2b"=135.9 mm) are displayed as candidates for selection. When the user selects any of these selection candidates via the operation unit 630, the selected approximate curve is set in the electric toothbrush 90.

Note that the minor axis and major axis of the selected ellipse and the dimensions (depth and width) of the part of the selected ellipse, which is used as an approximate curve, may be set by changing continuous values on the screen of the display 640.

Further, when the parabola U is used as the approximate curve, the coefficient p is preferably set variably.

(Brushing Evaluation)

In the brushing procedure described with reference to FIG. 6, brushing is performed in ascending order regarding the reference numerals, from the sites SQ1 to SQ8 in the maxillary dentition 98U and subsequently from SQ9 to SQ16 in the mandibular dentition 98L. Further, in the brushing procedure, as described in following Table 3, while brushing each site SQ1 to SQ16, it is set to brush for a predetermined brushing set time for each site SQ1 to SQ16.

For example, in the maxillary dentition 98U, the brushing set time is set to 8 seconds for the site SQ1, 4 seconds for the site SQ2, 9 seconds for the site SQ3, and so on. In the mandibular dentition 98L, the brushing set time is set to 5 seconds for the site SQ9, 5 seconds for the site SQ10, 7 seconds for the site SQ11, and so on.

TABLE 3

| Classification of sites | | | Sites | Brushing order | Brushing set time (sec) | Actual brushing time (sec) | Brushing evaluation value (%) |
|---|---|---|---|---|---|---|---|
| Maxillary dentition | Left back tooth | Front surface | SQ1 | 1 | 8 | 7.2 | 90% |
| | | Occlusal surface | SQ8 | 8 | 6 | 6 | 100% |
| | | Rear surface | SQ7 | 7 | 10 | 5.2 | 52% |
| | Front tooth | Front surface | SQ2 | 2 | 4 | 3.7 | 93% |
| | | Rear surface | SQ6 | 6 | 7 | 6.1 | 87% |
| | Right back tooth | Front surface | SQ3 | 3 | 9 | 6.9 | 77% |
| | | Occlusal surface | SQ4 | 4 | 7 | 6.7 | 96% |
| | | Rear surface | SQ5 | 5 | 11 | 5.2 | 47% |
| Mandibular dentition | Left back tooth | Front surface | SQ9 | 9 | 5 | 5 | 100% |
| | | Occlusal surface | SQ16 | 16 | 6 | 6 | 100% |
| | | Rear surface | SQ15 | 15 | 8 | 5.1 | 64% |
| | Front tooth | Front surface | SQ10 | 10 | 5 | 4.6 | 92% |
| | | Rear surface | SQ14 | 14 | 8 | 5.3 | 66% |
| | Right back tooth | Front surface | SQ11 | 11 | 7 | 6.6 | 94% |
| | | Occlusal surface | SQ12 | 12 | 5 | 4.1 | 82% |
| | | Rear surface | SQ13 | 13 | 8 | 5.5 | 69% |

As described regarding step S8 in FIG. 4, the specified brushing site BP and the actual brushing time for the site BP are associated and recorded in the table prepared in the storage unit 115 as the actual brushing time data for each site. In this example, as described in Table 3, the actual brushing times are values of 7.2 seconds for the site SQ1, 3.7 seconds for the site SQ2, 6.9 seconds for the site SQ3, . . . in the maxillary dentition 98U. In the mandibular dentition 98L, the values were 5 seconds for the site SQ9, 4.6 seconds for the site SQ10, 6.6 seconds for the site SQ11, and so on.

In this example, the control unit 610 of the smartphone 600 receives data (including actual brushing time data for each site) recorded in the table in the storage unit 115 from the electric toothbrush 90 via the communication unit 680. The control unit 610 operates as a brushing evaluation unit, and calculates an evaluation value (brushing evaluation value) representing a degree of coincidence with the brushing procedure based on the actual brushing time data for each site.

Specifically, a brushing evaluation value (unit: %) is calculated for the respective sites SQ1 to SQ16 by the following formula.

(Brushing evaluation value)=100×(actual brushing time (sec))/(brushing set time (sec))

In the example of the data in Table 3, the brushing evaluation values are 90% for the site SQ1, 93% for the site SQ2, 77% for the site SQ3, and so on in the maxillary dentition 98U. In the mandibular dentition 98L, the values are 100% for the site SQ9, 92% for the site SQ10, 94% for the site SQ11, and so on.

In this example, the control unit 610 of the smartphone 600 displays these brushing evaluation values on the display screen of the display 40. With this configuration, the user can recognize the degree of coincidence or difference of his or her brushing manner compared to the brushing procedure by looking at the display screen of the display 640. In particular, the user can recognize the difference tendency of his or her brushing with respect to the above described brushing procedure, that is, for example, the tendency of the rear surface of the left back tooth (site SQ7) and the rear surface of the right back tooth (site SQ5) to be particularly insufficient in brushing in the maxillary dentition 98U. Therefore, the user can improve his or her brushing manner.

In the above described embodiment, the control unit 110 of the electric toothbrush 90 executes the function of the brushing site detection unit; however, this example does not set any limitation. While performing communication between the electric toothbrush 90 and the smartphone 600 during tooth brushing, the control unit 610 of the smartphone 600 may execute a part or all of the function of the brushing site detection unit. In such a case, the configuration of the control unit 110 of the electric toothbrush 90 can be simplified. As a result, the control unit 110 can be configured by, for example, a logic integrated circuit (IC) as a substitute for the CPU.

For example, the control unit 610 of the smartphone 600 may perform the correction process (the flow in FIG. 18) while the control unit 110 of the electric toothbrush 90 performs basic specification of the brushing site BP among the functions of the brushing site detection unit (the flow in FIG. 4, particularly steps S2 and S3). With this configuration, the processing load can be distributed between the electric toothbrush 90 and the smartphone 600.

In order to configure the system combined with the electric toothbrush 90, a device that substantially serves as a computer device such as a tablet terminal or a personal computer may be used as a substitute for the smartphone 600.

The processing method executed by the control unit 110 of the electric toothbrush 90 or the control unit 610 of the smartphone 600 may be recorded in a recording medium, which can store data in a non-transitory manner, such as a compact disc (CD), a digital versatile disc (DVD), flash memory, and the like, as application software (computer program). When the application software recorded in such a recording medium is installed in a substantial computer device such as a personal computer, a personal digital assistance (PDA), a smartphone, and the like, the above-described method can be executed on the computer device.

When the user's dental arch is inclined with respect to the horizontal plane, an xyz orthogonal coordinate system may be set in the data space, and an approximate curve inclined with respect to the horizontal xy plane may be set. Thereby, such user's dental arch can be approximated with an approximate curve with high accuracy. Therefore, the translational position of the brushing site in the dentition can be obtained with high accuracy.

As described above, an electric toothbrush according to the present disclosure comprises:

a main body including, along its longitudinal axis direction, a head portion having a brush side on which brush bristles are planted, a grip portion to be held by a human hand, and a neck portion configured to connect the head portion and the grip portion;

a gyro sensor mounted inside the main body and configured to detect an angular velocity of the main body;

a brushing site detection unit configured to obtain a translational position of a brushing site in a dentition based on an output from the gyro sensor, and a receiving unit that is capable of receiving a setting parameter from outside of the main body, wherein the brushing site detection unit sets an approximate curve that curves corresponding to the dentition as a curve line equivalent to a part of an ellipse expressed by a function $y=b[\{1-(x/a)^2\}^{1/2}-1]$ using positive coefficients a and b or as a parabola expressed by a function $4py=x^2$ using a negative coefficient p, in a data space where an xy rectangular coordinate system is defined, sets the coefficients a and b or the coefficient p variably according to the setting parameter received via the receiving unit, obtains, based on the output from the gyro sensor, an angle formed by a longitudinal axis of the main body in a state that the brush bristles of the head portion contact with the brushing site in the dentition with respect to the longitudinal axis of the main body in a state that the brush bristles of the head portion contact with a reference position in the dentition, and obtains, based on the angle, a corresponding point corresponding to the brushing site on the approximate curve to use coordinates of the corresponding point as the translational position of the brushing site.

In the present description, the "brushing site" refers to a site that is brushed with the above-described brush bristles (where the brush bristles contact with) in a plurality of sites defined by dividing surfaces of the dentition in the oral cavity. The brushing site in the dentition is specified by a combination of a translational position in the real space where the dentition exists and which one of the front, rear, and occlusal surfaces of the dentition is being brushed.

The "reference position" of the dentition refers to a certain position as a reference for measuring the angle in the dentition.

In the electric toothbrush according to the present disclosure, the brushing site detection unit obtains the translational position of the brushing site in the dentition based on the output of the gyro sensor. In other words, the brushing site detection unit sets an approximate curve that curves corresponding to the dentition as a curve line equivalent to a part of an ellipse expressed by a function $y=b[\{1-(x/a)^2\}^{1/2}-1]$ using positive coefficients a and b or as a parabola expressed by a function $4py=x^2$ using a negative coefficient p, in a data space where an xy rectangular coordinate system is defined. Also, the brushing site detection unit sets the coefficients a and b or the coefficient p variably according to the setting parameter received via the receiving unit. Next, the brushing site detection unit obtains an angle formed by a longitudinal axis of the main body in a state that the brush bristles of the head portion contact with the brushing site in the dentition with respect to the longitudinal axis of the main body in a state that the brush bristles of the head portion contact with the reference position in the dentition, based on the output of the gyro sensor. Next, the brushing site detection unit obtains, based on the angle, a corresponding point corresponding to the brushing site on the approximate curve, and coordinates of the corresponding point is used as the translational position of the brushing site.

With this configuration, since the output of the gyro sensor is an angular velocity, a vibration component from the drive motor that vibrates the brush (brush bristles) is hardly included as noise. Further, since the output of the gyro sensor is an angular velocity, the angle can be obtained by first-order integration and is not easily affected by noise in the calculation process. Therefore, the translational position of the brushing site in the dentition can be obtained with high accuracy. In addition, the brushing site detection unit variably sets the coefficients a and b or the coefficient p according to the setting parameter received via the receiving unit. Therefore, the approximate curve can be appropriately set according to sizes and shapes of various users' dental arches. In such a case, the translational position of the brushing site in the dentition can be obtained with higher accuracy.

In the electric toothbrush of one embodiment, the brushing site detection unit sets a reference tangent line that contacts with a reference point corresponding to the reference position with respect to the approximate curve, sets a movable tangent line that forms the angle with respect to the reference tangent line and contacts with the approximate curve, and obtains a point, as the corresponding point, where the movable tangent line contacts with the approximate curve.

Here, the "movable tangent line" represents a tangent line that is variably set as the angle changes, or as the brushing site in the dentition changes, in other words.

In the electric toothbrush according to the embodiment, the brushing site detection unit sets a reference tangent line that contacts with the approximate curve at a reference point corresponding to the reference position, and sets a movable tangent line that forms the angle with respect to the reference tangent line and contacts with the approximate curve. A point where the movable tangent line contacts with the approximate curve is obtained as the corresponding point. Thereby, the corresponding point on the approximate curve can be obtained by a relatively simple process.

In the electric toothbrush of one embodiment, the reference position in the dentition is a center of a front surface of the dentition.

In the electric toothbrush according to the embodiment, since the reference position of the dentition is the center of the front surface of the dentition, the user can easily put the brush bristles of the head portion on the reference position where the user is supposed to start brushing his or her teeth. Further, the brushing site detection unit can easily obtain the translational position of the brushing site using an analytical expression.

In another aspect, an electric toothbrush of the present disclosure comprises:

a main body including, along its longitudinal axis direction, a head portion having a brush side on which brush bristles are planted, a grip portion to be held by a human hand, and a neck portion configured to connect the head portion and the grip portion, a gyro sensor configured to detect an angular velocity of the main body, and an acceleration sensor, which are mounted inside the main body, and a brushing site detection unit that specifies the brushing site in the dentition based on the output of the gyro sensor and the output of the acceleration sensor, wherein
the brushing site detection unit
obtains an angle formed by the longitudinal axis of the main body in a state that the brush bristles of the head portion contact with the brushing site in the dentition with respect to the longitudinal axis of the main body in a state that the brush bristles of the head portion contact with a reference position in the dentition,
obtains, based on the angle, a corresponding point corresponding to the brushing site on an approximate curve that curves corresponding to the dentition to use coordinates of the corresponding point as a translational position of the brushing site,
obtains a direction that the brush bristles of the head portion are facing around the longitudinal axis of the main body based on a direction of a gravitational acceleration output from the acceleration sensor and determines which one of a front surface, a rear surface, and an occlusal surface of the dentition is being brushed based on the direction that the brush bristles of the head portion are facing, and
specifies the brushing site in the dentition according to a combination of the translational position of the brushing site obtained based on the output from the gyro sensor and a determination result which one of the front, rear, and occlusal surfaces of the dentition is being brushed.

In the electric toothbrush of the present disclosure, the brushing site detection unit obtains an angle formed by the longitudinal axis of the main body in a state that the brush bristles of the head portion contact with the brushing site in the dentition with respect to the longitudinal axis of the main body in a state that the brush bristles of the head portion contact with a reference position in the dentition, and further obtains, based on the angle, a corresponding point corresponding to the brushing site on an approximate curve that curves corresponding to the dentition to use coordinates of the corresponding point as a translational position of the brushing site. Also, the brushing site detection unit obtains a direction that the brush bristles of the head portion are facing around the longitudinal axis of the main body based on the direction of gravitational acceleration output by the acceleration sensor, and determines which one of the front, rear, and the occlusal surfaces of the dentition is being brushed according to the direction that the brush bristles of the head portion are facing. Then, the brushing site detection unit specifies the brushing site in the dentition according to a combination of the translational position of the brushing site determined based on the output of the gyro sensor and the determination result of which one of the front, rear, and occlusal surfaces of the dentition is being brushed. Thereby, the brushing site in the dentition can be accurately specified.

In the electric toothbrush of one embodiment,
the brushing site detection unit
calculates a translational movement amount of the main body based on acceleration of the main body output from the acceleration sensor every predetermined aggregation unit time, and
performs a first correction process to maintain the translational position of the brushing site obtained based on the output from the gyro sensor during a certain aggregation unit time when the translational movement amount of the main body is equal to or lower than a predetermined first threshold value in the aggregation unit time.

In the present specification, the "translational movement amount" of the main body and the "change amount" of the direction of the longitudinal axis of the main body in a predetermined aggregation unit time respectively represent a total translational movement and a total change amount during the aggregation unit time.

In the electric toothbrush according to the embodiment, the brushing site detection unit calculates the translational movement amount of the main body based on the acceleration of the main body output from the acceleration sensor every predetermined aggregation unit time. Then, when the translational movement amount of the main body is equal to or less than a predetermined first threshold value in an aggregation unit time, the brushing site detection unit performs the first correction process for maintaining the translational position of the brushing site obtained based on the output of the gyro sensor in an aggregation unit time. Therefore, for example, when a user who is brushing his or her teeth significantly changes the direction of the longitudinal axis of the main body with almost no translational movement of the main body (particularly the head portion), the translational position of the brushing site obtained based on the output of the gyro sensor is maintained before and after the change. Thereby, the accuracy of the obtained translational position of the brushing site can be maintained.

In the electric toothbrush of one embodiment,
the brushing site detection unit
calculates the translational movement amount of the main body based on acceleration of the main body output from the acceleration sensor every predetermined aggregation unit time, and
performs a second correction process to reobtain the corresponding point based on the output from the gyro sensor by shifting to a part corresponding to a translational movement destination of the main body in the approximate curve when the translational movement amount of the main body is equal to or greater than a predetermined second threshold value.

In the electric toothbrush according to the embodiment, the brushing site detection unit calculates the translational movement amount of the main body based on the acceleration of the main body output from the acceleration sensor every predetermined aggregation unit time. Then, when the translational movement amount of the main body is equal to or greater than a predetermined second threshold value, the brushing site detection unit shifts to a portion corresponding to the translational movement destination of the main body on the approximate curve, and performs a second correction process for re-determining the corresponding point based on the output of the gyro sensor. Therefore, the translational position of the brushing site in the dentition can be obtained with high accuracy when the user who is brushing his or her teeth makes a translational movement of the main body by shifting from the left buccal site to the right buccal site across the front lip site in the maxillary dentition with almost no change of the orientation of the longitudinal axis of the main body.

Note that it is desirable to perform both the first correction process and the second correction process every aggregation unit time.

The electric toothbrush of one embodiment further comprises a transmission unit configured to transmit data related to brushing to outside of the main body.

In this description, the "data related to brushing" widely includes actual brushing time data for each site (data that includes a specified brushing site and an actual brushing time associated with the site) and other data related to brushing.

In the electric toothbrush according to the embodiment, the transmission unit can transmit data relating to brushing to outside of the main body. In this case, for example, the data can be received by a computer device provided outside the main body and used for various processes and applications.

In another aspect, a system according to the present disclosure comprises:

the above-described electric toothbrush; and a computer device provided outside the main body of the electric toothbrush, the electric toothbrush and the computer device being capable of communicating with each other.

The "computer device" may be any device as long as the devices substantially operate as a computer. For example, a smartphone, a tablet terminal, and the like may be used.

In the system of one embodiment, a brushing procedure is set for brushing a plurality of sites respectively in the dentition in a predetermined order for a predetermined brushing set time, and the system further includes a brushing evaluation unit configured to calculate an evaluation value that represents a degree of coincidence with respect to the brushing procedure based on the brushing site specified by the brushing site detection unit.

In the system according to the embodiment, the brushing procedure is defined so that a plurality of sites in the dentition are brushed in a predetermined order for a predetermined brushing set time, respectively. Here, the brushing evaluation unit calculates an evaluation value representing a degree of coincidence with the brushing procedure based on the brushing site specified by the brushing site detection unit. Therefore, the user can recognize the degree of coincidence (or difference) compared with the brushing procedure based on the evaluation value.

In another aspect, a brushing site detection method of the present disclosure is a brushing site detection method for detecting a brushing site brushed by an electric toothbrush in a dentition, in which the electric toothbrush includes a main body including, along its longitudinal axis direction, a head portion having a brush side on which brush bristles are planted, a grip portion to be held by a human hand, and a neck portion configured to connect the head portion and the grip portion, a gyro sensor mounted inside the main body and configured to detect an angular velocity of the main body, and a receiving unit that is capable of receiving a setting parameter from outside of the main body, and the brushing site detection method comprises:

setting an approximate curve that curves corresponding to the dentition as a curve line equivalent to a part of an ellipse expressed by a function $y=b[\{1-(x/a)^2\}^{1/2}-1]$ using positive coefficients a and b or as a parabola expressed by a function $4py=x^2$ using a negative coefficient p, in a data space where an xy rectangular coordinate system is defined, setting the coefficients a and b or the coefficient p variably according to the setting parameter received via the receiving unit, obtaining a difference angle formed by a longitudinal axis of the main body in a state that the brush bristles of the head portion contact with the brushing site in the dentition with respect to the longitudinal axis of the main body in a state that the brush bristles of the head portion contact with a reference position in the dentition based on an output from the gyro sensor in a real space where the dentition exists; and obtaining, based on the difference angle in the real space, a corresponding point corresponding to the brushing site on the approximate curve set in the data space to use coordinates of the corresponding point as data that represents a translational position of the brushing site.

In the brushing site detection method according to the present disclosure, first, an approximate curve curved corresponding to the dentition is set as a curve equivalent to a part of an ellipse expressed by a function $y=b[\{1-(x/a)^2\}^{1/2}-1]$ using the positive coefficients a and b or as a parabola expressed by a function $4py=x^2$ using the negative coefficient p, in a data space where an xy rectangular coordinate system is defined. Also, the coefficients a and b or the coefficient p are/is variably set according to the setting parameter received from the outside of the main body of the electric toothbrush via the receiving unit. Next, a difference angle formed by the longitudinal axis of the main body in a state that the brush bristles of the head portion contact with the brushing site in the dentition with respect to the longitudinal axis of the main body in a state that the brush bristles contact with the reference position in the dentition is obtained, based on an output from the gyro sensor in the real space where the dentition exists. Next, based on the difference angle in the real space, a corresponding point corresponding to the brushing site on the approximate curve, which is set in the data space, is obtained, and coordinates of the corresponding point are used as data indicating the translational position of the brushing site.

With this configuration, since the output of the gyro sensor is an angular velocity, a vibration component from the drive motor that vibrates the brush (brush bristles) is hardly included as noise. In addition, since the output of the gyro sensor is an angular velocity, the difference angle can be obtained by first-order integration and is not easily affected by noise in the calculation process. Therefore, the translational position of the brushing site in the dentition can be obtained with high accuracy. Also, in this brushing site detection method, the coefficients a and b or the coefficient p is variably set corresponding to the setting parameter received via the receiving unit. Therefore, the approximate curve can be appropriately set according to sizes and shapes of various users' dental arches. In such a case, the translational position of the brushing site in the dentition can be obtained with higher accuracy.

In still another aspect, a computer-readable recording medium of the present disclosure is a recording medium that non-transitorily stores a program for causing a computer to execute the above-described brushing site detection method.

By making a computer read the program recorded on the recording medium of the present disclosure, the above-described brushing site detection method can be executed by the computer.

In still another aspect, a brushing site detection method of the present disclosure is a brushing site detection method for detecting a brushing site brushed by an electric toothbrush in a dentition, in which the electric tooth brush includes a main body including, along its longitudinal axis direction, a head portion having a brush side on which brush bristles are planted, a grip portion to be held by a human hand, and a neck portion configured to connect the head portion and the grip portion, a gyro sensor configured to detect an angular velocity of the main body, and an acceleration sensor, which are mounted inside the main body, and the brushing site detection method comprises:

obtaining an angle formed by the longitudinal axis of the main body in a state that the brush bristles of the head portion contact with the brushing site in the dentition with respect to the longitudinal axis of the main body in a state that the brush bristles of the head portion contact with a reference position in the dentition based on an output from the gyro sensor;

obtaining, based on the angle, a corresponding point corresponding to the brushing site on an approximate curve that curves corresponding to the dentition to use coordinates of the corresponding point as a translational position of the brushing site;

obtaining a direction that the brush bristles of the head portion are facing around the longitudinal axis of the main body based on a gravitational acceleration output from the acceleration sensor to determine which one of a front surface, a rear surface, and an occlusal surface of the dentition is being brushed according to the direction that the brush bristles of the head portion are facing; and specifying the brushing site in the dentition based on a combination of the translational position of the brushing site obtained based on the output from the gyro sensor and the determination result which one of the front, rear and occlusal surfaces of the dentition is being brushed.

According to the brushing site detection method of the present disclosure, the brushing site in the dentition can be specified with high accuracy.

In still another aspect, a computer-readable recording medium of the present disclosure is a recording medium that non-transitorily stores a program for causing a computer to execute the above-described brushing site detection method.

By making a computer read the program recorded on the recording medium of the present disclosure, the above-described brushing site detection method can be executed by the computer.

As is clear from the above, according to the electric toothbrush, system and brushing site detection method of the present disclosure, a translational position of a brushing site in the dentition can be obtained with high accuracy.

Further, by making a computer read the program recorded on the recording medium of the present disclosure, the above-described brushing site detection method can be executed by the computer.

The above embodiments are illustrative, and are modifiable in a variety of ways without departing from the scope of this invention. It is to be noted that the various embodiments described above can be appreciated individually within each embodiment, but the embodiments can be combined together. It is also to be noted that the various features in different embodiments can be appreciated individually by its own, but the features in different embodiments can be combined.

The invention claimed is:

1. An electric toothbrush comprising:
a main body including, along its longitudinal axis direction, a head portion having a brush side on which brush bristles are planted, a grip portion to be held by a human hand, and a neck portion configured to connect the head portion and the grip portion;
a gyro sensor mounted inside the main body and configured to detect an angular velocity of the main body;
a brushing site detection unit configured to obtain a translational position of a brushing site in a dentition based on an output from the gyro sensor; and
a receiving unit that is capable of receiving a setting parameter from outside of the main body,
wherein the brushing site detection unit:
sets an approximate curve that curves corresponding to the dentition as a curve line equivalent to a part of an ellipse expressed by a function $y=b[\{1-(x/a)^2\}^{1/2}-1]$ using positive coefficients a and b or as a parabola expressed by a function $4py=x^2$ using a negative coefficient p, in a data space where an xy rectangular coordinate system is defined;
sets the coefficients a and b or the coefficient p variably according to the setting parameter received via the receiving unit;
obtains, based on the output from the gyro sensor, an angle formed by a longitudinal axis of the main body in a state that the brush bristles of the head portion contact with the brushing site in the dentition with respect to the longitudinal axis of the main body in a state that the brush bristles of the head portion contact with a reference position in the dentition; and
obtains, based on the angle, a corresponding point corresponding to the brushing site on the approximate curve to use coordinates of the corresponding point as the translational position of the brushing site.

2. The electric toothbrush according to claim 1, wherein the brushing site detection unit sets a reference tangent line that contacts with a reference point corresponding to the reference position with respect to the approximate curve, sets a movable tangent line that forms the angle with respect to the reference tangent line and contacts with the approximate curve, and obtains a point, as the corresponding point, where the movable tangent line contacts with the approximate curve.

3. The electric toothbrush according to claim 1, wherein the reference position in the dentition is a center of a front surface of the dentition.

4. The electric toothbrush according to claim 1, further comprising:
a transmission unit configured to transmit data related to brushing to outside of the main body.

5. A system comprising:
the electric toothbrush according to claim 4; and
a computer device provided outside the main body of the electric toothbrush, the electric toothbrush and the computer device being capable of communicating with each other.

6. The system according to claim 5, wherein
a brushing procedure is set for brushing a plurality of sites respectively in the dentition in a predetermined order for a predetermined brushing set time, and
the system further includes a brushing evaluation unit configured to calculate an evaluation value that represents a degree of coincidence with respect to the brushing procedure based on the brushing site specified by the brushing site detection unit.

7. An electric toothbrush comprising:
a main body including, along its longitudinal axis direction, a head portion having a brush side on which brush bristles are planted, a grip portion to be held by a human hand, and a neck portion configured to connect the head portion and the grip portion;

a gyro sensor configured to detect an angular velocity of the main body, and an acceleration sensor, which are mounted inside the main body; and a brushing site detection unit that specifies the brushing site in the dentition based on the output of the gyro sensor and the output of the acceleration sensor, wherein the brushing site detection unit:

obtains an angle formed by the longitudinal axis of the main body in a state that the brush bristles of the head portion contact with the brushing site in the dentition with respect to the longitudinal axis of the main body in a state that the brush bristles of the head portion contact with a reference position in the dentition;

obtains, based on the angle, a corresponding point corresponding to the brushing site on an approximate curve that curves corresponding to the dentition to use coordinates of the corresponding point as a translational position of the brushing site;

obtains a direction that the brush bristles of the head portion are facing around the longitudinal axis of the main body based on a direction of a gravitational acceleration output from the acceleration sensor and determines which one of a front surface, a rear surface, and an occlusal surface of the dentition is being brushed based on the direction that the brush bristles of the head portion are facing; and specifies the brushing site in the dentition according to a combination of the translational position of the brushing site obtained based on the output from the gyro sensor and a determination result which one of the front, rear, and occlusal surfaces of the dentition is being brushed.

8. The electric toothbrush according to claim 7, wherein the brushing site detection unit:

calculates a translational movement amount of the main body based on acceleration of the main body output from the acceleration sensor every predetermined aggregation unit time; and performs a first correction process to maintain the translational position of the brushing site obtained based on the output from the gyro sensor during a certain aggregation unit time when the translational movement amount of the main body is equal to or lower than a predetermined first threshold value in the aggregation unit time.

9. The electric toothbrush according to claim 7, wherein the brushing site detection unit:

calculates the translational movement amount of the main body based on acceleration of the main body output from the acceleration sensor every predetermined aggregation unit time; and performs a second correction process to reobtain the corresponding point based on the output from the gyro sensor by shifting to a part corresponding to a translational movement destination of the main body in the approximate curve when the translational movement amount of the main body is equal to or greater than a predetermined second threshold value.

10. A brushing site detection method for detecting a brushing site brushed by an electric toothbrush in a dentition, in which the electric toothbrush includes:

a main body including, along its longitudinal axis direction, a head portion having a brush side on which brush bristles are planted, a grip portion to be held by a human hand, and a neck portion configured to connect the head portion and the grip portion;

a gyro sensor mounted inside the main body and configured to detect an angular velocity of the main body; and a receiving unit that is capable of receiving a setting parameter from outside of the main body; and the brushing site detection method comprises:

setting an approximate curve that curves corresponding to the dentition as a curve line equivalent to a part of an ellipse expressed by a function $y=b[\{1-(x/a)^2\}^{1/2}-1]$ using positive coefficients a and b or as a parabola expressed by a function $4py=x^2$ using a negative coefficient p, in a data space where an xy rectangular coordinate system is defined;

setting the coefficients a and b or the coefficient p variably according to the setting parameter received via the receiving unit;

obtaining a difference angle formed by a longitudinal axis of the main body in a state that the brush bristles of the head portion contact with the brushing site in the dentition with respect to the longitudinal axis of the main body in a state that the brush bristles of the head portion contact with a reference position in the dentition based on an output from the gyro sensor in a real space where the dentition exists; and obtaining, based on the difference angle in the real space, a corresponding point corresponding to the brushing site on the approximate curve set in the data space to use coordinates of the corresponding point as data that represents a translational position of the brushing site.

11. A computer-readable recording medium that non-transitorily stores a program for causing a computer to execute the brushing site detection method according to claim 10.

12. A brushing site detection method for detecting a brushing site brushed by an electric toothbrush in a dentition, in which the electric tooth brush includes:

a main body including, along its longitudinal axis direction, a head portion having a brush side on which brush bristles are planted, a grip portion to be held by a human hand, and a neck portion configured to connect the head portion and the grip portion; and a gyro sensor configured to detect an angular velocity of the main body, and an acceleration sensor, which are mounted inside the main body; and the brushing site detection method comprises:

obtaining an angle formed by the longitudinal axis of the main body in a state that the brush bristles of the head portion contact with the brushing site in the dentition with respect to the longitudinal axis of the main body in a state that the brush bristles of the head portion contact with a reference position in the dentition based on an output from the gyro sensor;

obtaining, based on the angle, a corresponding point corresponding to the brushing site on an approximate curve that curves corresponding to the dentition to use coordinates of the corresponding point as a translational position of the brushing site;

obtaining a direction that the brush bristles of the head portion are facing around the longitudinal axis of the main body based on a gravitational acceleration output from the acceleration sensor to determine which one of a front surface, a rear surface, and an occlusal surface of the dentition is being brushed according to the direction that the brush bristles of the head portion are facing; and specifying the brushing site in the dentition based on a combination of the translational position of the brushing site obtained based on the output from the gyro sensor and the determination result which one of the front, rear and occlusal surfaces of the dentition is being brushed.

13. A computer-readable recording medium that non-transitorily stores a program for causing a computer to execute the brushing site detection method according to claim 12.

* * * * *